(12) United States Patent
Zhao et al.

(10) Patent No.: US 12,119,935 B2
(45) Date of Patent: Oct. 15, 2024

(54) METHOD FOR TRANSMITTING SIDELINK DATA, AND TERMINAL DEVICE

(71) Applicant: GUANGDONG OPPO MOBILE TELECOMMUNICATIONS CORP., LTD., Dongguan (CN)

(72) Inventors: Zhenshan Zhao, Dongguan (CN); Qianxi Lu, Dongguan (CN); Huei-Ming Lin, Victoria (AU)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 262 days.

(21) Appl. No.: 17/507,327

(22) Filed: Oct. 21, 2021

(65) Prior Publication Data
US 2022/0045794 A1    Feb. 10, 2022

Related U.S. Application Data

(63) Continuation of application No. PCT/CN2019/083941, filed on Apr. 23, 2019.

(51) Int. Cl.
*H04W 4/00*  (2018.01)
*H04L 1/08*  (2006.01)
*H04L 5/00*  (2006.01)

(52) U.S. Cl.
CPC ............. *H04L 1/08* (2013.01); *H04L 5/0055* (2013.01)

(58) Field of Classification Search
CPC .......... H04L 1/08; H04L 5/0055; H04W 4/70; H04W 4/44
See application file for complete search history.

(56) References Cited

U.S. PATENT DOCUMENTS

2009/0040959 A1    2/2009  Jung et al.
2020/0068609 A1*   2/2020  Wang .................... H04W 72/02
(Continued)

FOREIGN PATENT DOCUMENTS

| CN | 108347307 A | 7/2018 |
| CN | 108347313 A | 7/2018 |

(Continued)

OTHER PUBLICATIONS

Second Office Action issued in corresponding European Application No. 19926648.7, mailed Feb. 7, 2023.
(Continued)

*Primary Examiner* — Abdelnabi O Musa
(74) *Attorney, Agent, or Firm* — BAYES PLLC

(57) ABSTRACT

The embodiments of the present disclosure relate to a method for transmitting sidelink data, and a terminal device. The method includes a second terminal device in a plurality of terminal devices receiving sidelink data. The sidelink data is transmitted to the plurality of terminal devices by a first terminal device. The method also includes the second terminal device receiving retransmission of the sidelink data transmitted by the first terminal device and obtaining a retransmission feedback resource. The retransmission feedback resource is used for carrying feedback information of the retransmission. The method further includes the second terminal device determining whether to transmit the feedback information of the retransmission to the first terminal device according to whether the sidelink data is successfully decoded.

18 Claims, 6 Drawing Sheets

(56) References Cited

U.S. PATENT DOCUMENTS

| | | | |
|---|---|---|---|
| 2020/0092685 A1* | 3/2020 | Fehrenbach | H04W 76/14 |
| 2020/0106500 A1* | 4/2020 | Noh | H04B 7/0621 |
| 2020/0154404 A1* | 5/2020 | Göktepe | H04L 1/0061 |
| 2020/0305127 A1* | 9/2020 | Huang | H04W 72/0453 |
| 2020/0313804 A1* | 10/2020 | Ryu | H04W 72/20 |
| 2020/0313825 A1* | 10/2020 | Ryu | H04W 72/20 |
| 2021/0084462 A1* | 3/2021 | Hwang | H04L 1/1819 |
| 2021/0306824 A1* | 9/2021 | Li | H04W 4/40 |
| 2021/0400681 A1* | 12/2021 | Wang | H04W 72/0453 |
| 2022/0053513 A1* | 2/2022 | Ryu | H04W 72/1263 |
| 2022/0060286 A1* | 2/2022 | Yoshioka | H04L 1/1896 |
| 2022/0078753 A1* | 3/2022 | Park | H04W 28/02 |
| 2022/0182206 A1* | 6/2022 | Zhao | H04L 5/0055 |
| 2022/0183028 A1* | 6/2022 | Lee | H04W 72/542 |
| 2022/0248434 A1* | 8/2022 | Zhao | H04L 1/1861 |

FOREIGN PATENT DOCUMENTS

| | | |
|---|---|---|
| CN | 108540272 A | 9/2018 |
| CN | 108923894 A | 11/2018 |
| JP | H11196041 A | 7/1999 |
| JP | 2003348186 A | 12/2003 |
| JP | 2016523498 A | 8/2016 |
| KR | 20090015253 A | 2/2009 |
| WO | 2016002436 A1 | 1/2016 |
| WO | 2016107244 A1 | 7/2016 |
| WO | 2017084514 A1 | 5/2017 |
| WO | 2019064983 A1 | 4/2019 |

OTHER PUBLICATIONS

Second Office Action issued in corresponding Chinese Application No. 202111220858.5, mailed Mar. 2, 2023.
First Office Action issued in corresponding Japanese Application No. 2021-563195, mailed Mar. 3, 2023.
Huawei et al., "Sidelink physical layer procedures for NR V2X", R1-1903944, 3GPP TSG RAN WG1 Meeting #96bis Xi'an, China, Apr. 8-12, 2019.
Decision of Rejection issued in corresponding Chinese Application No. 202111220858.5, mailed May 31, 2023.
Third Office Action issued in corresponding European Application No. 19926648.7, mailed Jul. 14, 2023.
Second Office Action issued in corresponding Japanese Application No. 2021-563195, mailed Aug. 8, 2023.
First Office Action issued in corresponding European Application No. 19926648.7, mailed Sep. 8, 2022.
First Office Action issued in corresponding Chinese Application No. 202111220858.5, mailed Nov. 30, 2022 .
Extended European Search Report issued in corresponding European Application No. 19926648.7, mailed Feb. 24, 2022, 9 pages.
First Office action issued in corresponding India Application No. 202127052362, mailed Apr. 5, 2022, 7 pages.
"NR Sidelink Physical Layer Procedure", Agenda Item: 7.2.4.5, Source: NTT Docomo, Inc., 3GPP TSG RAN WG1 #96bis, R1-1905425, Xi'an, China, Apr. 8-12, 2019, 8 pages.
"Considerations on Sidelink HARQ Procedure", Agenda: 7.2.4.1.5, Source: Samsung, 3GPP TSG RAN WG1 #96, R1-1902278, Athens, Greece, Feb. 25-Mar. 1, 2019, 11 pages.
"Physical layer procedure for NR-V2X", Agenda: 7.2.4.1.2, Source: Oppo, 3GPP TSG RAN WGI Ad-Hoc Meeting 1901, RI-1900301, Taipei, Jan. 21-25, 2019, 10 pages.
International Search Report issued in corresponding International Application No. PCT/CN2019/083941, mailed Jan. 22, 2020, 30 pages.
PCT Written Opinion of the International Searching Authority issued in corresponding International Application No. PCT/CN2019/083941, mailed Jan. 22, 2020, 7 pages.
"Consideration on physical layer procedures", Agenda Item: 7.2.4.1.2, Source: Spreadtrum Communications, 3GPP TSG RAN WG1 Meeting #95, R1-1813075, Spokane, USA, Nov. 12-16, 2018, 6 pages.
"Sidelink physical layer procedures for Nr V2X", Agenda Item: 7.2.4.1.2, Source: Huawei, HiSilicon, 3GPP TSG RAN WG1 Meeting #96, R1-1901537, Athens, Greece, Feb. 25-Mar. 1, 2019, 16 pages.
"Discussion on physical layer procedure for Nr V2X", Agenda Item: 7.2.4.1.2, Source: LG Electronics, 3GPP TSG RAN WG1 Meeting, #96 R1-1901931, Athens, Greece, Feb. 25-Mar. 1, 2019, 12 pages.
"Physical layer procedures for HARQ operation for groupcast and unicast transmissions", Agenda item: 7.2.4.1.2, Source: Qualcomm Incorporated, 3GPP TSG RAN WG1 Meeting #96, R1-1902995, Athens, Greece, Feb. 25-Mar. 1, 2019, 12 pages.
"Remaining details on PHY procedures for Rel. 16 NR V2X", Agenda Item: 7.2.4.1.2, Source: Ericsson, 3GPP TSG RAN WG1 Meeting #96, R1-1903164, Athens, Greece Feb. 25-Mar. 1, 2019, 11 pages.
"Discussion on physical layer procedure", Agenda Item: 7.2.4.1.2, Source: MediaTek Inc., 3GPP TSG RAN WG1 #96, R1-1901810, Athens, Greece, Feb. 25-Mar. 1, 2019, 9 pages.
"On Physical Layer Procedures for NR V2X", Agenda item: 7.2.4.1.2, Source: Samsung, 3GPP TSG RAN WG1 #96, R1-1902274, Athens, Greece, Feb. 25-Mar. 1, 2019, 13 pages.
"Summary for AI 7.2.4.2.2 Mode-2 Resource Allocation", Agenda item: 7.2.4.2.2, Source: Intel Corporation, 3GPP TSG RAN WG1 Meeting #96bis, R1-1905652, Xi'an, China, Apr. 8-12, 2019, 24 pages.
"Sidelink physical layer procedure for NR V2X", Agenda Item: 7.2.4.1.2, Source: NTT Docomo, Inc., 3GPP TSG RAN WG1 #96, R1-1902799, Athens, Greece, Feb. 25-Mar. 1, 2019, 8 pages.
Decision of Reexamination issued in corresponding Chinese Application No. 202111220858.5, mailed Oct. 31, 2023.
Hearing Notice issued in corresponding Indian Application No. 202127052362, mailed Nov. 7, 2023.
Notice of Allowance issued in corresponding Japanese Application No. 2021-563195, mailed Nov. 10, 2023.
Third Office Action issued in corresponding Chinese Application No. 202111220858.5, mailed Dec. 28, 2023.
Fourth Office Action issued in corresponding Chinese Application No. 202111220858.5, mailed May 29, 2024.
First Office Action issued in corresponding Korean Application No. 10-2021-7035714, mailed Jul. 8, 2024.
European Search Report issued in corresponding European Application No. 24 17 8833, dated Aug. 14, 2024, 9 pages.

* cited by examiner

METHOD FOR TRANSMITTING SIDELINK DATA, AND TERMINAL DEVICE

CROSS-REFERENCE TO RELATED APPLICATION

This application is a continuation of International Application No. PCT/CN2019/083941, filed on Apr. 23, 2019, the entire contents of which are incorporated herein by reference.

BACKGROUND

The present disclosure relate to the field of communications, and more particularly, to a method for transmitting sidelink data and a terminal device.

In NR-V2X, in order to improve the reliability of service transmission, a feedback mechanism for sidelink data transmission is introduced. In addition, the related art only provides a scheme in which a transmitting end terminal allocates a feedback resource for sidelink data of first time transmission to a receiving end terminal to be used for transmitting by the receiving end terminal feedback information; but for the case that a plurality of receiving end terminals exist, a scheme about how a feedback resource of retransmission data may be allocated to these receiving end terminals by the transmitting end terminal is not provided.

SUMMARY

The embodiments of the present disclosure provide a method for transmitting sidelink data and a terminal device, which can improve the success rate of feedback channel reception.

In a first aspect, there is provided a method for transmitting sidelink data, including: transmitting, by a first terminal device, sidelink data to a plurality of terminal devices; and if the first terminal device determines that a terminal device that does not successfully receive the sidelink data exists in the plurality of terminal devices, transmitting, by the first terminal device, retransmission data of the sidelink data and a retransmission feedback resource to each terminal device in the plurality of terminal devices, where the retransmission feedback resource is used for transmitting feedback information of the retransmission data by the plurality of terminal devices.

In a second aspect, there is provided a method for transmitting sidelink data, including: receiving, by a second terminal device in a plurality of terminal devices, sidelink data, where the sidelink data is transmitted to the plurality of terminal devices by a first terminal device; receiving, by the second terminal device, retransmission data of the sidelink data transmitted by the first terminal device; obtaining, by the second terminal device, a retransmission feedback resource, where the retransmission feedback resource is used for carrying feedback information of the retransmission data; and determining, by the second terminal device, whether to transmit the feedback information of the retransmission data to the first terminal device according to whether the sidelink data is successfully received.

In a third aspect, there is provided a method for transmitting sidelink data, including: transmitting, by a first terminal device, sidelink data to a plurality of terminal devices; determining, by the first terminal device, a third terminal device that does not successfully receive the sidelink data and a second terminal device that successfully receives the sidelink data exist in the plurality of terminal devices; and transmitting, by the first terminal device, retransmission data of the sidelink data and a retransmission feedback resource to the third terminal device only, where the retransmission feedback resource is used for carrying feedback information of the retransmission data.

In a fourth aspect, there is provided a method for transmitting sidelink data, including: receiving, by a second terminal device in a plurality of terminal devices, sidelink data, where the sidelink data is transmitted to the plurality of terminal devices by a first terminal device; receiving, by the second terminal device, retransmission data of the sidelink data transmitted by the first terminal device; and in the case that the second terminal device successfully receives the sidelink data and does not receive a retransmission feedback resource transmitted by the first terminal device, abandoning, by the second terminal device, transmitting feedback information of the retransmission data to the first terminal device, where the retransmission feedback resource is used for carrying the feedback information of the retransmission data.

In a fifth aspect, there is provided a terminal device, configured to perform the method in the foregoing first aspect or in various implementation manners thereof. In particular, the terminal device includes a functional module for performing the method in any of the foregoing first aspect to fourth aspect or in various implementation manners thereof.

In a sixth aspect, there is provided a terminal device, including a processor and a memory. The memory is configured to store a computer program, and the processor is configured to call and run the computer program stored in the memory so as to perform the method in any of the foregoing first aspect to fourth aspect or in various implementation manners thereof.

In a seventh aspect, there is provided a chip, configured to implement the method in any of the foregoing first aspect to fourth aspect or in various implementation manners thereof. In particular, the chip includes: a processor, configured to call and run a computer program from a memory, so that a device installed with the chip performs the method in any of the foregoing first aspect to fourth aspect or in various implementation manners thereof.

In an eighth aspect, there is provided a computer-readable storage medium for storing a computer program, and the computer program causes a computer to perform the method in any of the foregoing first aspect to fourth aspect or in various implementation manners thereof.

In a ninth aspect, there is provided a computer program product, including a computer program instruction, and the computer program instruction causes a computer to perform the method in any of the foregoing first aspect to fourth aspect or in various implementation manners thereof.

In a tenth aspect, there is provided a computer program, and when the computer program is run on a computer, the computer is caused to perform the method in any of the foregoing first aspect to fourth aspect or in various implementation manners thereof.

Based on the foregoing technical solutions, the transmitting end terminal transmits the sidelink data to the receiving end. If the transmitting end terminal determines that there is a terminal device that does not successfully receive the sidelink data, when the transmitting end terminal performs retransmission, no matter whether the receiving end terminal feeds ACK or NACK back, the transmitting end terminal may also allocate the transmission resource for transmitting the feedback information of the retransmission data to each receiving end terminal while transmitting the retransmission data. However, a terminal that correctly received the sidelink data before may not transmit the feedback information, which can reduce the overhead of feedback signaling; or a terminal that correctly received the sidelink data before also correctly receives the retransmission, then it feeds the ACK back for both cases, which can improve the success rate of feedback channel reception.

In addition, when performing retransmission, the transmitting end may also select not to allocate the transmission resource for transmitting the feedback information to the receiving end terminal; instead, in th case that the transmitting end terminal receives the NACK or the DTX transmitted by the receiving end terminal, when the transmitting end terminal performs retransmission, the transmission resource for transmitting feedback information may be allocated to the receiving end terminal, which can reduce the overhead of the feedback resource, reduce conflict between feedback channels, and improve the detection success rate of feedback information.

DETAILED DESCRIPTION

The technical solutions in the embodiments of the present disclosure will be described below in conjunction with the accompanying drawings in the embodiments of the present disclosure. Obviously, the embodiments described are part of embodiments of the present disclosure, rather than all the embodiments. Based on the embodiments in the present disclosure, all other embodiments obtained by those of ordinary skilled in the art without creative work fall within the protection scope of the present disclosure.

The technical solutions of the embodiments of the present disclosure may be applied to various communication systems, for example, a Global System of Mobile communication (GSM), a Code Division Multiple Access (CDMA) system, a Wideband Code Division Multiple Access (WCDMA) system, General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system, or a 5G system, etc.

Figure 1:
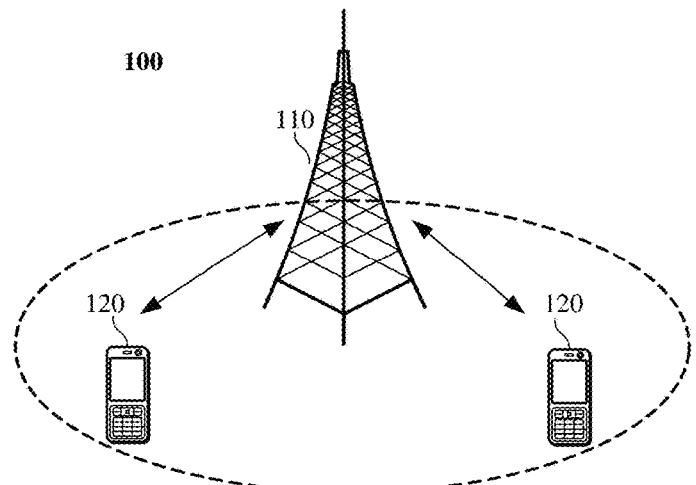
FIG. 1 is a schematic diagram of a communication system architecture provided by an embodiment of the present disclosure.

Exemplarily, a communication system 100 applied in the embodiments of the present disclosure is as shown in FIG. 1. The communication system 100 may include a network device 110, and the network device 110 may be a device which communicates with a terminal device 120 (or referred to as a communication terminal or a terminal). The network device 110 may provide communication coverage for a specific geographic area, and may communicate with a terminal device located within the coverage area. Optionally, the network device 110 may be a Base Transceiver Station (BTS) in a GSM or a CDMA system, a NodeB (NB) in a WCDMA system, an Evolutional Node B (eNB or eNodeB) in an LTE system or a wireless controller in a Cloud Radio Access Network (CRAN). Or, the network device may be a mobile switching center, a relay station, an access point, an in-vehicle device, a wearable device, a hub, a switch, a bridge, a router, a network side device in a 5G network or a network device in a future evolved Public Land Mobile Network (PLMN), etc.

The communication system 100 also includes at least one terminal device 120 located within the coverage area of the network device 110. As used herein, the "terminal device" includes, but is not limited to: a connection via a wired line, such as a connection via Public Switched Telephone Networks (PSTN), a Digital Subscriber Line (DSL), a digital cable, a direct cable; and/or another data connection/network; and/or an interface via wireless, such as a transmitter for a cellular network, a Wireless Local Area Network (WLAN), a digital TV network such as a DVB-H network, a satellite network, an AM-FM broadcast transmitter; and/or an apparatus of another terminal device set to receive/transmit a communication signal; and/or an Internet of Things (IoT) device. The terminal device set to communicate through a wireless interface may be referred to as a "wireless communication terminal", a "wireless terminal" or a "mobile terminal". Examples of the mobile terminal include, but not limited to: a satellite or cellular telephone; a Personal Communications System (PCS) terminal which may combine a cellular radio telephone with capabilities of data processing, faxing and data communication; a PDA which may include a radio telephone, a pager, internet/intranet access, a web browser, a notebook, a calendar, and/or a Global Positioning System (GPS) receiver; and a conventional laptop and/or palmtop receiver or other electronic apparatus including a radio telephone transceiver. The terminal device may refer to an access terminal, User Equipment (UE), a user unit, a user station, a mobile station, a mobile platform, a remote station, a remote terminal, a mobile device, a user terminal, a terminal, a wireless communication device, a user agent or a user apparatus. The access terminal may be a cellular telephone, a cordless telephone, a Session Initiation Protocol (SIP) telephone, a Wireless Local Loop (WLL) station, a Personal Digital Assistant (PDA), a wireless communication functional handheld device, computing device or other processing device connected to a wireless modem, an in-vehicle device, a wearable device, a terminal device in a 5G network or a terminal device in a future evolved PLMN, etc.

Optionally, Device to Device (D2D) communication may be performed between the terminal devices 120.

Optionally, a 5G system or a 5G network may also be referred to as a New Radio (NR) system or a NR network.

FIG. 1 exemplarily shows one network device and two terminal devices. Optionally, the communication system 100 may include a plurality of network devices, and other number of terminal devices may be included within the coverage area of each network device, which is not limited by the embodiments of the present disclosure.

Optionally, the communication system 100 may also include other network entity such as a network controller, a mobile management entity and the like, which is not limited by the embodiments of the present disclosure.

It should be understood that the device with a communication function in the network/system in the embodiments of the present disclosure may be referred to as a communication device. Taking the communication system 100 shown in FIG. 1 as an example, the communication device may include a network device 110 and a terminal device 120 with the communication function, and the network device 110 and the terminal device 120 may be the specific devices described above, which is not elaborated here; the communication device may also include other device in the communication system 100, for example, other network entity such as a network controller, a mobile management entity and the like, which is not limited in the embodiments of the present disclosure.

It should be understood that the terms "system" and "network" herein are often used interchangeably herein. The term "and/or" herein is only to describe a kind of association relationship among associated objects, and means that there may be three kinds of relationships. For example, A and/or B, may mean that there are the following three cases: A exists alone, A and B exist at the same time, and B exists alone. In addition, the character "/" herein generally indicates that the associated objects before and after are in an "or" relationship.

Device-to-device communication is a sidelink (SL) transmission technology based on device to device (D2D). Different from the manner in which communication data is received or transmitted through a base station in a conventional cellular system, an internet of vehicles system adopts a manner of device to device direct communication, and therefore has higher spectral efficiency and lower transmission delay.

Figure 2:
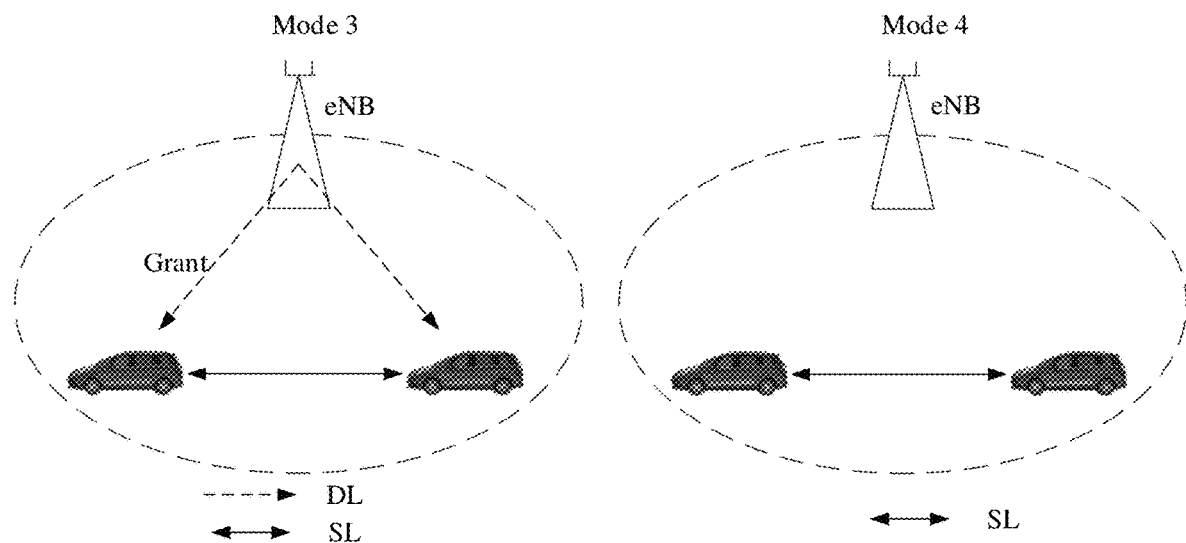
FIG. 2 is a schematic diagram of an internet of vehicles system architecture provided by an embodiment of the present disclosure.

Two transmission modes of sidelink are defined in 3GPP: Mode A and Mode B. In particular, FIG. 2 shows a schematic diagram of the two transmission modes. As shown in the left diagram in FIG. 2, the Mode A refers to: a transmission resource of a terminal is allocated by a base station, and the terminal transmits data on the sidelink according to a resource allocated through a downlink (DL) by the base station; and the base station may allocate a resource for single transmission to the terminal, or may allocate a resource for semi-static transmission to the terminal. As shown in the right diagram in FIG. 2, the Mode B refers to: an in-vehicle terminal selects a resource in a resource pool so as to transmit sidelink data.

In 3GPP, the D2D is divided into different stages to be studied, for example, proximity based service (ProSe) direct communication: in Rel-12/13, the device-to-device communication is studied with respect to a ProSe scenario, which is mainly for service in public safety; for another example, internet of vehicles (such as vehicle to everything (V2X)) communication: in Rel-14/15, the internet of vehicles system is studied with respect to a scenario of vehicle-to-vehicle communication, which mainly faces service of relatively high speed vehicle-to-vehicle communication or vehicle-to-human communication; and for still another example, a wearable device (for example, further enhancements D2D (FeD2D)): in Rel-14, this scenario is studied with respect to a scenario where the wearable device accesses the network through a mobile phone, which mainly faces a scenario of low moving speed and low power access.

In LTE-V2X, broadcast service is supported, i.e., one terminal transmits data, and all surrounding terminals receive the data. In NR-V2X, unicast service and groupcast service are introduced on the basis of this broadcast. For the unicast service, UE 1 transmits data, UE 2 receives the data, and other user does not need to receive the data; and for the groupcast service, one terminal device group includes a plurality of terminals, one terminal in the group transmits data, and other terminal(s) in the group receives the data. The unicast service may also be regarded as a type of special groupcast service.

Further, in the NR-V2X, in order to improve the reliability of service transmission, a feedback mechanism for sidelink data transmission is introduced. For the unicast service or the groupcast service, a receiving end terminal decides to transmit Hybrid Automatic Repeat reQuest (HARQ) Acknowledgement (ACK) or HARQ Negative-Acknowledgement (NACK) to a transmitting end according to the demodulation state of received sidelink data; and the transmitting terminal decides whether to retransmit according to the HARQ ACK/NACK fed back by the receiving end.

In the NR-V2X, the HARQ ACK/NACK may be carried through a physical sidelink feedback channel (PSFCH). A transmission resource of the PSFCH may be pre-configured or network-configured, or may be determined according to a transmission resource of a Physical Sidelink Shared Channel (PSSCH) transmitted by the transmitting end.

Figure 3:
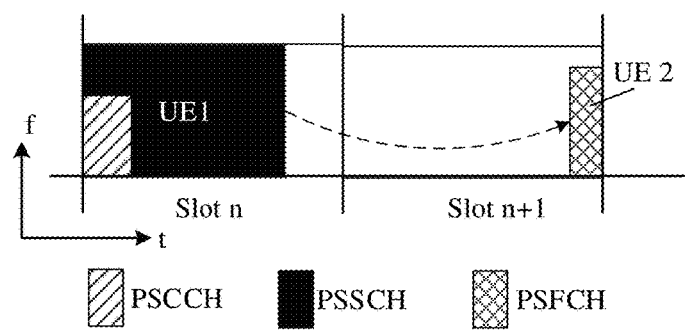
FIG. 3 is a schematic diagram of sidelink data transmission provided by an embodiment of the present disclosure.

For example, taking communication between the UE 1 and the UE 2 as an example here, the UE 1 and the UE 2 may be in the unicast communication, or the communication may be communication between the transmitting end (the UE 1) and any one of the receiving ends (the UE 2) in groupcast communication. As shown in FIG. 3, the UE 1 transmits sidelink data to the UE 2 in slot n. For example, the sidelink data may include a physical sidelink control channel (PSCCH) and the PSSCH; and the UE 2 transmits feedback information for the sidelink data to the UE 1 through the PSFCH in slot n+1. A slot interval between the slot where the PSSCH is located and the slot where the PSFCH is located may be pre-configured or network-configured, or may be determined by the transmitting end terminal; a symbol position and a number of symbol occupied by the PSFCH in slot n+1 may be pre-configured or network configured, for example, the symbol position and the number of symbol of the PSFCH in one slot is configured through resource pool configuration information of the PSFCH; and the frequency domain starting position of the PSFCH may be the same as the frequency domain starting position of the PSSCH, and the frequency domain size may be pre-configured or network-configured.

For the unicast communication or the groupcast communication, a feedback resource used by the receiving end terminal may be allocated by the transmitting end terminal. The advantage is that the transmitting end terminal may learn PSFCH resources of all of the receiving end terminals, without performing a PSFCH blind detection. In addition, if the PSFCHs of all of the receiving end terminals are in one slot, the issue of half-duplex may be avoided.

However, the related art only provides a scheme in which the transmitting end terminal allocates a feedback resource for sidelink data of first time transmission to the receiving end terminal to be used for transmitting by the receiving end terminal feedback information, but does not provide a scheme about how a feedback resource is allocated to retransmission data. In addition, for a receiving end terminal that has already transmitted the HARQ ACK, there is no solution about whether the feedback information needs to be transmitted when the retransmission data of the sidelink data has been received again.

For example, if one terminal in any group transmits sidelink data to other terminal(s), and the other terminal(s) receives the sidelink data, and according to the receiving condition, transmits feedback information for the sidelink data to the transmitting end terminal, for example, HARQ ACK or HARQ NACK may be transmitted. If the transmitting end terminal receives the HARQ NACK, retransmission needs to be performed. But in a process of transmitting the sidelink data for the first time, there may be part of the terminals that has already correctly received the sidelink data and fed the HARQ ACK back. At this time, it is an issue to be solved currently about how the transmitting end terminal and the receiving end terminal will process, for example, how the transmitting end terminal will allocate a feedback resource for the receiving end terminal, and how a terminal that has already transmitted the HARQ ACK transmits feedback information when having received retransmission data.

Figure 4:
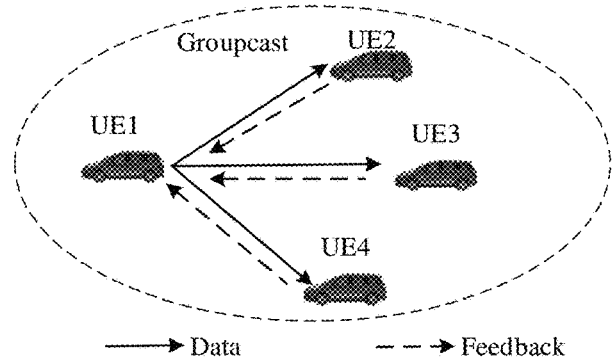
FIG. 4 is a schematic diagram of groupcast communication including a plurality of terminals provided by an embodiment of the present disclosure.
Figure 5:
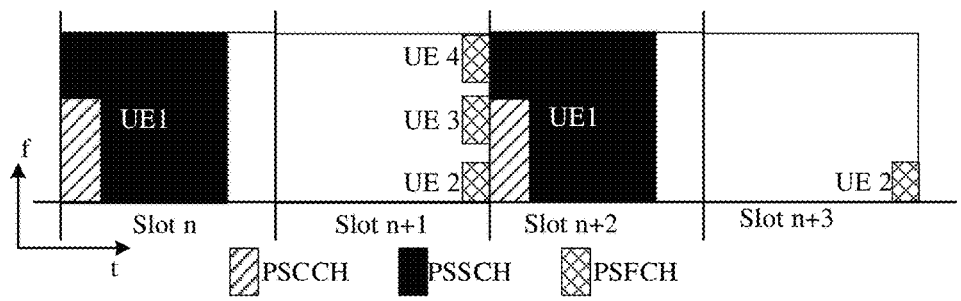
FIG. 5 is a schematic diagram of another type of sidelink data transmission provided by an embodiment of the present disclosure.

FIG. 4 shows a schematic diagram of a groupcast communication group. As shown in FIG. 4, UE 1, UE 2, UE 3, and UE 4 together form one communication group, and it is assumed here that the UE 1 transmits sidelink data to other three terminals. FIG. 5 shows a schematic diagram of sidelink data transmission in the process of the groupcast communication. As shown in FIG. 5, when the UE 1 transmits groupcast data in slot n, the UE 2, the UE 3, and the UE 4 need to transmit feedback information of the groupcast data, for example, the UE 1 allocates a transmission resource for transmitting feedback information to the UE 2, the UE 3 and the UE 4 in slot n+1. Assuming that the UE 3 and the UE 4 correctly receive the groupcast data, then ACK is transmitted to the UE 1; and assuming that the UE 2 does not correctly receive the groupcast data, then NACK may be transmitted to the UE1. When the UE 1 receives the NACK transmitted by the terminal, data retransmission needs to be performed, and it is assumed that the UE 1 performs the data retransmission in slot n+2. At this time, the UE1 also needs to allocate a transmission resource for transmitting feedback information of the retransmission data to the UE 2, is it necessary to allocate the transmission resource of the feedback information of the retransmission data to the UE 3 and the UE 4 that have already correctly received the groupcast data? In addition, when the UE 3 and the UE 4 receive the retransmission data transmitted by the UE 1, is it still necessary to transmit the feedback information to the UE 1?

Therefore, the embodiments of the present disclosure propose several methods for transmitting sidelink data, which can solve the aforementioned issues in the process of the retransmission.

Figure 6:
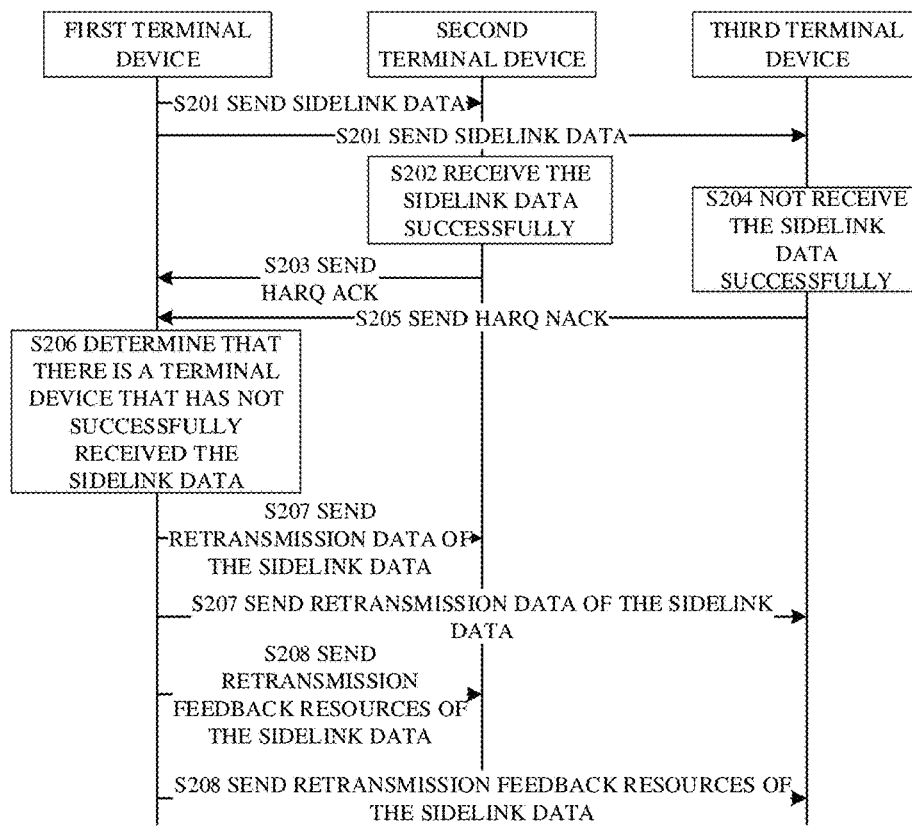
FIG. 6 is a schematic flow chart of a method for transmitting sidelink data provided by an embodiment of the present disclosure.

FIG. 6 is a schematic flow chart of a method 300 for transmitting sidelink data provided by an embodiment of the present disclosure. As shown in FIG. 6, the method 200 includes: S201, transmitting sidelink data, i.e., a first terminal device transmitting sidelink data to at least one terminal device.

In particular, the method 200 may be used in the unicast communication or the groupcast communication. Correspondingly, the first terminal device may refer to any one of the terminal device in the unicast communication or the groupcast communication. The receiving end that receives the sidelink data is at least one terminal device, and the at least one terminal device is other terminal device except for the first terminal device. For example, as shown in FIG. 4, the first terminal device may refer to the UE 1 as shown in FIG. 4, and the at least one terminal device at the receiving end may be the UE 2, the UE 3, and the UE 4 as shown in FIG. 4.

For example, the method 200 is used in the process of unicast transmission, and then in S201, the first terminal device transmits the sidelink data to another terminal device.

For another example, the method 200 may also be used in the process of groupcast transmission, and then in S201, the first terminal device transmits the sidelink data to other of a plurality of terminal devices in the groupcast.

Considering that for a terminal device that receives the sidelink data, it may successfully receive the sidelink data, or it may not successfully receive the sidelink data, for ease of description, in the embodiments of the present disclosure, the terminal device that successfully receives the sidelink data is referred to as a second terminal device, and the terminal device that does not successfully receive the sidelink data is referred to as a third terminal device.

For example, the first terminal device transmits the sidelink data to a plurality of terminal devices, and then in the plurality of terminal devices, the second terminal device refers to a terminal device that successfully receives the sidelink data, and the third terminal device refers to a terminal device that does not successfully receive the sidelink data. That is, the second terminal device and the third terminal device in the embodiments of the present disclosure may refer to different terminal devices.

In other words, the first terminal device transmits sidelink data to at least one terminal device, and for any terminal device at the receiving end, if the terminal device successfully receives the sidelink data, it is referred to as the second terminal device; and if the terminal device does not successfully receive the sidelink data, it is referred to as the third terminal device. That is, the second terminal device and the third terminal device in the embodiments of the present disclosure may also refer to two possible states of any terminal device at the receiving end.

Therefore, the transmitting sidelink data in S201 includes: the first terminal device transmitting the sidelink data to a second terminal device; and also includes: the first terminal device transmits the sidelink data to a third terminal device.

It should be understood that the sidelink data in the embodiments of the present disclosure may refer to any sidelink data transmitted by the first terminal device. For example, the sidelink data may include a PSSCH and a PSCCH. For another example, the sidelink data may refer to data transmitted for the first time; or the sidelink data may refer to any retransmission data of certain data transmitted for the first time.

Optionally, S201 may also include: the first terminal device transmitting sidelink data and a data feedback resource of the sidelink data to at least one terminal device, where the data feedback resource is used for transmitting by the at least one terminal device feedback information of the sidelink data to the first terminal device. In particular, the data feedback resource transmitted by the first terminal device may refer to some specific feedback resources, so that the at least one terminal device directly transmits the feedback information of the sidelink data on the feedback resource. Alternatively, the data feedback resource transmitted by the first terminal device may also refer to a feedback resource set, so that the at least one terminal device selects a resource for transmitting the feedback information in the feedback resource set.

As shown in FIG. 6, the method 200 also includes: S202, successfully receiving the sidelink data, i.e., for the sidelink data transmitted by the first terminal device, a second terminal device determining that the sidelink data transmitted by the first terminal device is successfully received, and then continuing to execute S203.

In S203, HARQ ACK information is transmitted, i.e., in the case that the second terminal device successfully receives the sidelink data, the second terminal device transmits the feedback information to the first terminal device, and the feedback information may be ACK information, for example, the HARQ ACK information.

It should be understood that before the second terminal device transmits the ACK information, the method 200 also includes: the second terminal device obtaining the data feedback resource, so that the second terminal device transmits the ACK information on the data feedback resource. In particular, obtaining the data feedback resource by the second terminal device may include: the second terminal device receiving the data feedback resource transmitted by the first terminal device. If the data feedback resource is a specific resource, such as a specific time domain resource, frequency domain resource and code domain resource, etc., then the second terminal device may directly transmit the ACK information using the data feedback resource; and if the data feedback resource is a feedback resource set, then the second terminal device may also select a resource in the feedback resource set to transmit the ACK information. Optionally, the second terminal device selects a resource from the feedback resource set according to identification information of the second terminal device. For example, the feedback resource set includes N feedback resources, the terminal identifiers in the group are 1, 2, . . . N, and the terminal whose terminal identifier is k in the group selects the mod(k, N)$^{th}$ feedback resource; and mod( ) represents a mod process. Optionally, the identification information is identification information of the second terminal device in the communication group.

As shown in FIG. 6, the method 200 also includes: S204, not successfully receiving the sidelink data, i.e., for the sidelink data transmitted by the first terminal device, the third terminal device determining that the sidelink data is not successfully received, and then continuing to execute S205.

It should be understood that not successfully receiving the sidelink data by the third terminal device in the embodiments of the present disclosure, includes: failure of demodulating the sidelink data by the third terminal device.

In S205, HARQ NACK information is transmitted, i.e., in the case that the third terminal device does not successfully receive the sidelink data, the feedback information of the sidelink data transmitted to the first terminal device by the third terminal device is NACK information, for example, the HARQ NACK information.

Optionally, S205 may also include: in the case that the third terminal device does not successfully receive the sidelink data, not transmitting the feedback information to the first terminal device. For example, in the case that the third terminal device does not successfully receive control information for indicating the sidelink data, the third terminal device cannot receive the sidelink data, and then does not transmit the feedback information of the sidelink data to the first terminal device.

It should be understood that, similar to transmitting the ACK information by the second terminal device, before the third terminal device transmits the NACK information, the method 200 also includes: the third terminal device obtaining the data feedback resource, so that the third terminal device transmits the NACK information on the data feedback resource. In particular, the obtaining the data feedback resource by the third terminal device may include: the third terminal device receiving the data feedback resource transmitted by the first terminal device. If the data feedback resource is a specific resource, such as a specific time domain resource, frequency domain resource and domain resource, etc., then the third terminal device may directly transmit the NACK information using the data feedback resource; and if the data feedback resource is a feedback resource set, then the third terminal device may also select a resource in the feedback resource set to transmit the NACK information. For example, the third terminal device may select a resource in the feedback resource set according to its identification information. Optionally, the identification information is identification information of the third terminal device in the communication group.

As shown in FIG. 6, the method 200 also includes: S206, determining that a terminal device that does not successfully receive the sidelink data exists, i.e., after transmitting the sidelink data to at least one terminal device, the first terminal device determining whether a terminal device that does not successfully receive the sidelink data exists in the at least one terminal device according to received feedback information transmitted by the at least one terminal device; and if the first terminal device determining that a terminal device that does not successfully receive the sidelink data exists, then continuing to execute S207 and S208.

In particular, on the data feedback resource transmitted to at least one terminal device, the first terminal device detects feedback information of the at least one terminal device, and determines whether a terminal device that does not successfully receive the sidelink data exists according to the detection result. For example, taking any terminal device in the at least one terminal device as an example, here it is referred to as the second terminal device, if feedback information of the second terminal device is not found on the data feedback resource, then the first terminal device may consider that the second terminal device is in a discontinuous transmission (DTX) state, and determine that the second terminal device does not successfully receive the sidelink data. If the first terminal device detected and received feedback information of the sidelink data transmitted by the second terminal device on the data feedback resource, then the first terminal device may determine whether the second terminal device successfully receives the sidelink data according to the feedback information of the sidelink data. For example, if the feedback information of the sidelink data is the ACK information, the first terminal device determines that the second terminal device successfully receives the sidelink data; and if the feedback information of the sidelink data is the NACK information, the first terminal device determines that the second terminal device does not successfully receive the sidelink data.

It should be understood that when the first terminal device detects the feedback information, an incorrect detection may exist, and the first terminal device determines whether a terminal device that does not successfully receive the sidelink data exists according to the detection result. For example, the second terminal device successfully receives the sidelink data and transmits the ACK information to the first terminal device, but the first terminal device may detect the ACK information as the NACK information or may not detect (find) the ACK information. At this time, the first terminal device determines that the second terminal device does not successfully receive the sidelink data. For another example, the third terminal device does not successfully receive the sidelink data and transmits the NACK message to the first terminal device, but the first terminal device may not detect the NACK information, and then the first terminal device determines that the third terminal device does not successfully detect the sidelink data, which is not limited by the embodiments of the present disclosure.

As shown in FIG. 6, the method 200 also includes: S207, transmitting retransmission data of the sidelink data; and S208, transmitting a retransmission feedback resource of the retransmission data. That is, if the first terminal device determines that a terminal device that does not successfully receive the sidelink data exists in the at least one terminal device, then the retransmission data of the sidelink data is transmitted to each terminal device in the at least one terminal device. In addition, the retransmission feedback resource of the retransmission data may also be transmitted to each terminal device, where the retransmission feedback resource is used for transmitting by the receiving end terminal device feedback information of the retransmission data.

Therefore, the transmitting the retransmission data of the sidelink data in S207, includes: the first terminal device transmitting the retransmission data to the second terminal device; and also includes: the first terminal device transmitting the retransmission data to the third terminal device. The transmitting the retransmission feedback resource of the retransmission data in S208, includes: the first terminal device transmitting the retransmission feedback resource of the retransmission data to the second terminal device; and also includes: the first terminal device transmitting the retransmission feedback resource of the retransmission data to the third terminal device.

It should be understood that the retransmission data in the embodiments of the present disclosure refers to retransmission data of the sidelink data, and the retransmission data may refer to any retransmission data that is corresponding to the sidelink data and is transmitted by the first terminal device. For example, it is assumed that the sidelink data is data transmitted for the first time, then the retransmission data of the sidelink data refers to any subsequent retransmission data. For another example, it is assumed that the sidelink data is not data transmitted for the first time, then the retransmission data of the sidelink data refers to data retransmitted after the sidelink data.

It should be understood that, similar to the data feedback resource transmitted by the first terminal device, the retransmission feedback resource may refer to a specific feedback resource, so that a terminal device that receives the retransmission feedback resource may directly transmit the feedback information of the retransmission data on the feedback resource. Alternatively, the retransmission feedback resource transmitted by the first terminal device may also refer to a feedback resource set, so that a terminal device that receives the retransmission feedback resource selects a resource for transmitting the feedback information of the retransmission data from the feedback resource set.

It should be understood that in the case that the first terminal device transmits the retransmission data and the retransmission feedback resource corresponding to the retransmission data to each terminal device, the second terminal device and the third terminal device may execute different steps, which will be described below in conjunction with FIG. 7 and FIG. 8 respectively.

Figure 7:
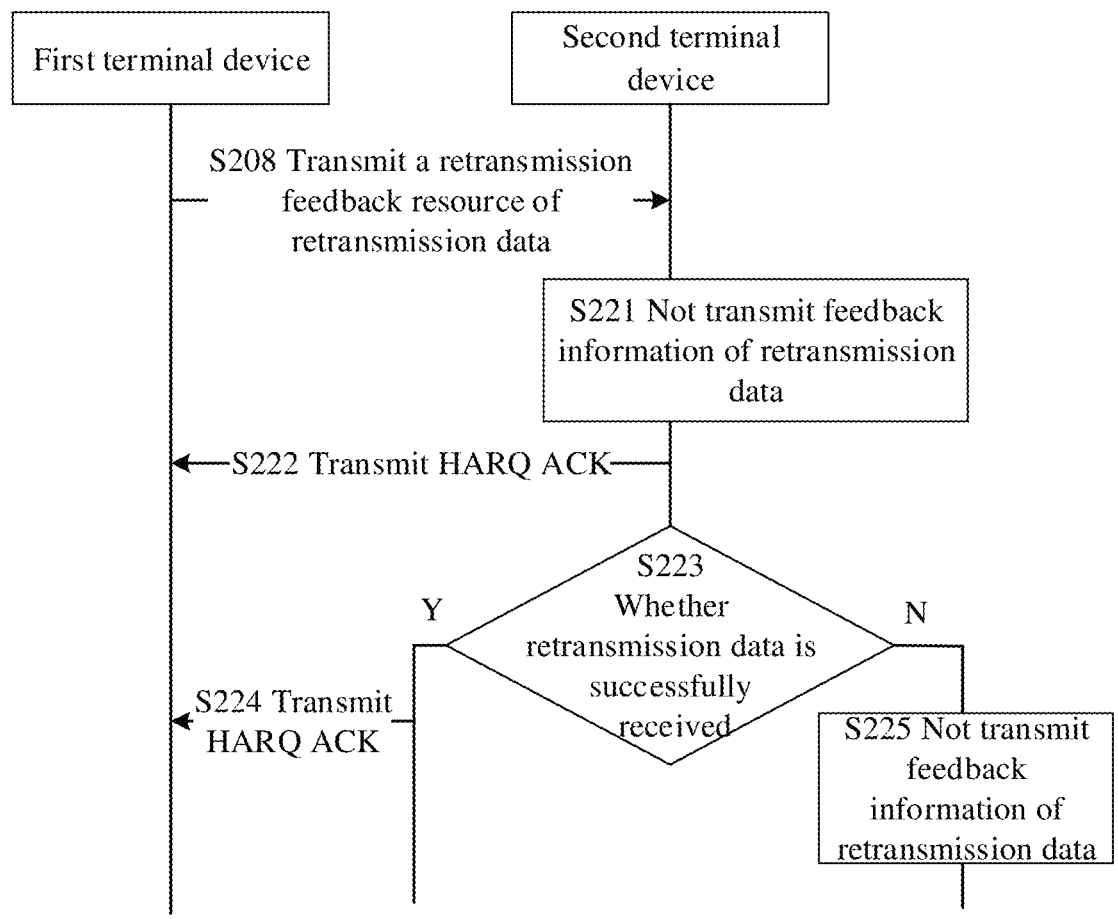
FIG. 7 is another schematic flow chart of a method for transmitting sidelink data provided by an embodiment of the present disclosure.

FIG. 7 shows another schematic flow chart of the method 200 for transmitting the sidelink data of an embodiment of the present disclosure, and FIG. 7 is a continuation of the method 200 in FIG. 6. As shown in FIG. 7, the first terminal device is the first terminal device of the method 200 in FIG. 6; and the second terminal device is the second terminal device of the method 200 in FIG. 6.

As shown in FIG. 7, the method 200 includes: S208, transmitting the retransmission feedback resource of the retransmission data, i.e., the first terminal device transmitting the retransmission feedback resource to the second terminal device. It should be understood that S208 in FIG. 7 is the S208 in FIG. 6, which is not elaborated here for simplicity.

For the second terminal device of the receiving end, since the second terminal device has already successfully received the sidelink data, when the second terminal device also receives the retransmission data of the sidelink data and the retransmission feedback resource of the retransmission data, the second terminal device may have several processing manners as below.

In the first manner, in S221, the feedback information of the retransmission data is not transmitted, i.e., although the second terminal device receives the retransmission data and the corresponding retransmission feedback resource, no matter whether the second terminal device successfully receives the retransmission data, the second terminal device does not transmit the feedback information of the retransmission data to the first terminal device, that is, the second terminal device does not transmit the feedback information of the retransmission data using the retransmission feedback resource.

In the second manner, in S222, the HARQ ACK is transmitted. Since the second terminal device has already successfully received the sidelink data, no matter whether the second terminal device successfully receives the retransmission data, the second terminal device transmits the ACK information to the first terminal device, that is, the ACK information is transmitted to the first terminal device by using the retransmission feedback resource.

In the third manner, in S223, it is determined whether the retransmission data is successfully received. The second terminal device determines whether the retransmission data is successfully received. If the second terminal device successfully receives the retransmission data, S224 is executed;

and if the second terminal device does not successfully receive the retransmission data, S225 is executed.

In S224, the HARQ ACK is transmitted, i.e., in the case that the second terminal device successfully receives the retransmission data, the second terminal device transmits the ACK information to the first terminal device on the retransmission feedback resource.

In S225, the feedback information of the retransmission data is not transmitted. Since the second terminal device has already successfully received the sidelink data, in the case that the second terminal device does not successfully receive the retransmission data, the second terminal device does not transmit the feedback information of the retransmission data to the first terminal device, that is, the second terminal device does not transmit the feedback information of the retransmission data using the retransmission feedback resource.

It should be understood that in each of the foregoing manners, for the case where the second terminal device transmits the ACK information of the retransmission data, the method 200 also includes: the second terminal device obtaining the retransmission feedback resource, so that the second terminal device transmits the ACK information on the retransmission feedback resource. In particular, the obtaining the retransmission feedback resource by the second terminal device may include: the second terminal device receiving the retransmission feedback resource transmitted by the first terminal device. If the retransmission feedback resource is a specific resource, such as a specific time domain resource, a specific frequency domain resource and a specific code domain resource, etc., then the second terminal device may directly transmit the ACK information using the retransmission feedback resource; and if the retransmission feedback resource is a feedback resource set, then the second terminal device may select a resource from the feedback resource set for transmitting the ACK information.

Therefore, no matter which of the foregoing manners the second terminal device adopts, as long as the first terminal device has received either of the HARQ ACK for the sidelink data and the HARQ ACK for the retransmission data, which are transmitted by the second terminal device, it may be considered that the second terminal has already successfully received the data. Moreover, through transmitting a plurality of the HARQ ACK, the probability that the first terminal device correctly receives the HARQ ACK can also be improved.

Figure 8:
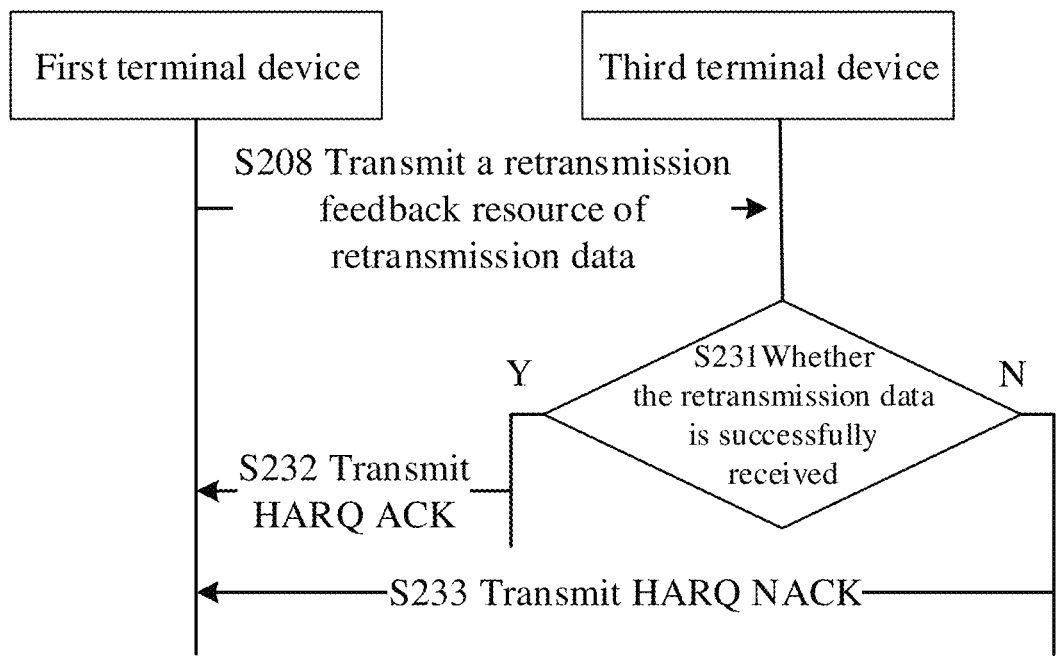
FIG. 8 is still another schematic flow chart of a method for transmitting sidelink data provided by an embodiment of the present disclosure.

FIG. 8 shows another schematic flow chart of the method 200 for transmitting the sidelink data of an embodiment of the present disclosure, and FIG. 8 is a continuation of the method 200 in FIG. 6. As shown in FIG. 8, the first terminal device is the first terminal device of the method 200 in FIG. 6; and the third terminal device is the third terminal device of the method 200 in FIG. 6. In addition, each step in FIG. 7 and each step in FIG. 8 may be used independently, or may be used in combination, which is not limited by the embodiments of the present disclosure.

As shown in FIG. 8, the method 200 includes: S208, transmitting the retransmission feedback resource of the retransmission data, i.e., the first terminal device transmitting the retransmission feedback resource to the third terminal device. It should be understood that S208 in FIG. 8 is the S208 in FIG. 6, which is not elaborated here for simplicity.

For the third terminal device of the receiving end, since the third terminal device does not successfully receive the sidelink data, when the third terminal device receives the retransmission data of the sidelink data and the retransmission feedback resource of the retransmission data, the third terminal device may execute the following steps S231 to S233.

In S231, it is determined whether the retransmission data is successfully received, i.e., the third terminal device determines whether the retransmission data is successfully received. If the third terminal device successfully receives the retransmission data, S232 is executed; and if the third terminal device does not successfully receive the retransmission data, S233 is executed.

In S232, the HARQ ACK is transmitted, i.e., in the case that the third terminal device successfully receives the retransmission data, the ACK information is transmitted to the first terminal device on the retransmission feedback resource.

In S233, the HARQ NACK is transmitted, i.e., in the case that the third terminal device does not successfully receive the retransmission data, the third terminal device transmits the NACK information to the first terminal device on the retransmission feedback resource. Alternatively, if the third terminal device does not detect control information of the retransmission data, then the third terminal device may not receive the retransmission data, and then the feedback information of the retransmission data is not transmitted.

Correspondingly, if the feedback information of the retransmission data that is transmitted by the third terminal device and received by the first terminal device is the NACK information or the first terminal device does not receive the feedback information of the retransmission data of the third terminal device, then the first terminal device may determine that the third terminal device does not successfully receive the retransmission data. Since at this time, the first terminal device may consider that the third terminal device does not successfully receive the sidelink data and the retransmission data of the sidelink data, the first terminal device may continue to transmit the retransmission data and the feedback resource of the feedback information of the retransmission data to the third terminal device, which is not limited by the embodiments of the present disclosure.

Therefore, in the method for transmitting the sidelink data according to the embodiments of the present disclosure, the transmitting end terminal transmits the sidelink data to the receiving end. If the transmitting end terminal determines that a terminal device that does not successfully receive the sidelink data exists, when the transmitting end terminal is performing retransmission, no matter the receiving end terminal feeds the ACK or the NACK back, the transmitting end terminal may allocate a transmission resource for transmitting the feedback information to each receiving end terminal. That is, when transmitting the sidelink data and its retransmission data, the transmitting end terminal allocates the feedback transmission resource to all of the receiving end terminal(s), and the number of transmission resources allocated by the transmitting end terminal is consistent. However, a terminal that correctly received the sidelink data before may not transmit the feedback information, which can reduce the overhead of feedback signaling; or a terminal that correctly received the sidelink data before and also correctly received the retransmission, feeds the ACK back for the above two receptions, which can improve the success rate of feedback channel reception.

The method 200 for transmitting the sidelink data according to the embodiments of the present disclosure is described in detail in conjunction with FIG. 6 to FIG. 8 hereinabove, and another method for transmitting the sidelink data according to embodiments of the present disclosure will be described below in conjunction with FIG. 9 to FIG. 13.

Figure 9:
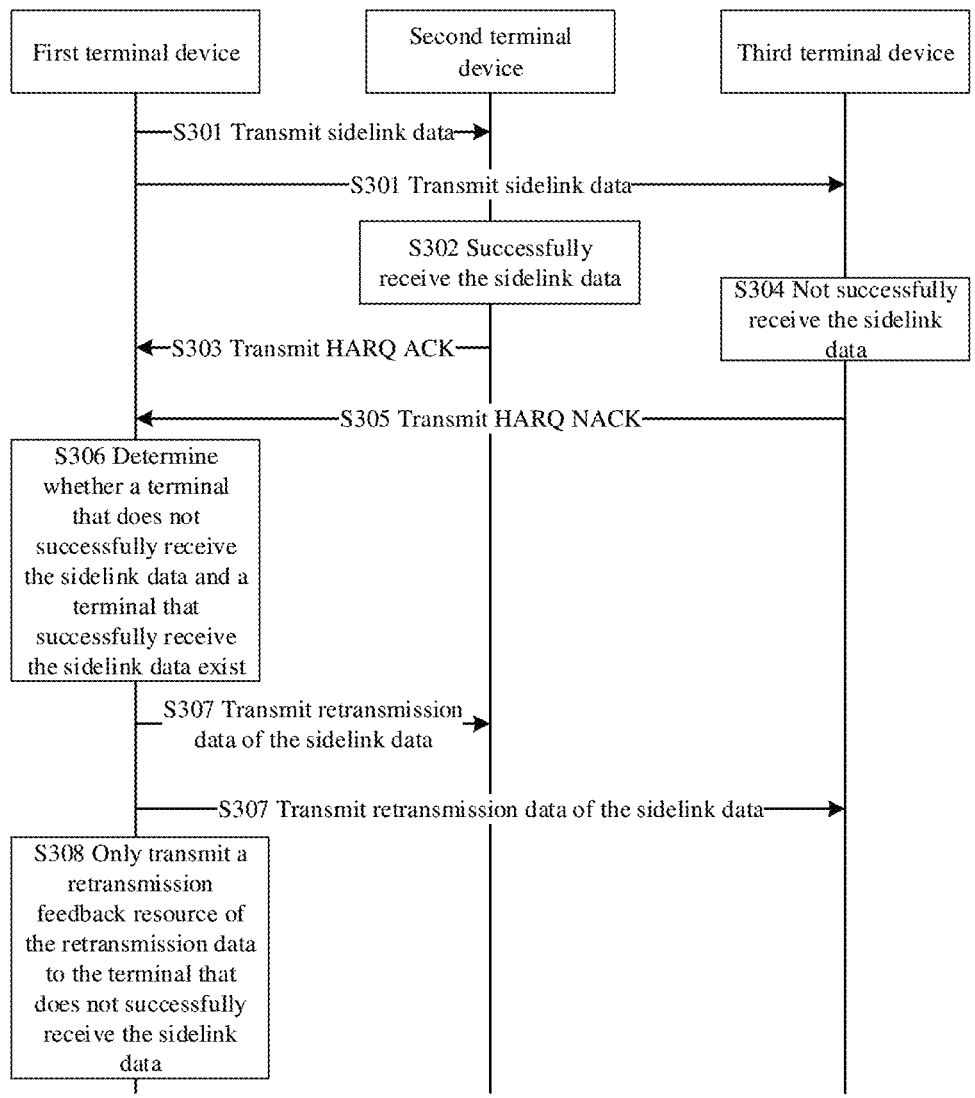
FIG. 9 is a schematic flow chart of another method for transmitting sidelink data provided by an embodiment of the present disclosure.

FIG. 9 shows a schematic flow chart of a method 300 for transmitting sidelink data according to an embodiment of the present disclosure. As shown in FIG. 9, the method 300 includes: S301, transmitting sidelink data, i.e., a first terminal device transmitting the sidelink data to at least one terminal device.

As shown in FIG. 9, the method 300 also includes: S302, successfully receiving the sidelink data, i.e., for the sidelink data transmitted by the first terminal device, a second terminal device determining that the sidelink data transmitted by the first terminal device is successfully received, and then S303 being continued to be executed.

In S303, HARQ ACK information is transmitted, i.e., in the case that the second terminal device successfully receives the sidelink data, the second terminal device transmits feedback information to the first terminal device, and the feedback information may be ACK information, for example, the HARQ ACK information.

As shown in FIG. 9, the method 300 also includes: S304, not successfully receiving the sidelink data, i.e., for the sidelink data transmitted by the first terminal device, the third terminal device determining that the sidelink data is not successfully received, and then S305 being continued to be executed.

In S305, HARQ NACK information is transmitted, i.e., in the case that the third terminal device does not successfully receive sidelink data, feedback information of the sidelink data that is transmitted to the first terminal device and is transmitted by the third terminal device is NACK information, for example, the HARQ NACK information.

As shown in FIG. 9, the method 300 also includes: S306, determining whether a terminal device that does not successfully receive the sidelink data and a terminal device that successfully receives the sidelink data exist. That is, after transmitting the sidelink data to at least one terminal device, the first terminal device may determine whether a terminal device that does not successfully receive the sidelink data and a terminal that successfully receives the sidelink data exist in the at least one terminal device according to received feedback information transmitted by the at least one terminal device; and if the first terminal device determines that the terminal device that does not successfully receive the sidelink data exists, then S307 and S308 is continued to be executed.

As shown in FIG. 9, the method 300 also includes: S307, transmitting retransmission data of the sidelink data; and S308, only transmitting a retransmission feedback resource of the retransmission data to the terminal device that does not successfully receive the sidelink data. In particular, if determining that the terminal device that does not successfully receive the sidelink data exists in the at least one terminal device, then the first terminal device transmits the retransmission data of the sidelink data to each terminal device in the at least one terminal device; but the first terminal device only transmits the retransmission feedback resource of the retransmission data to the terminal device that is determined by the first terminal device to be not successfully receiving the sidelink data, where the retransmission feedback resource is used for transmitting by the receiving end terminal device feedback information of the retransmission data. In other words, for the terminal device that is determined by the first terminal device to be successfully receiving the sidelink data, the first terminal device does not transmit the retransmission data feedback resource to it.

It should be understood that the foregoing S301 to S307 in the method 300 may correspond to S201 to S207 in the method 200 respectively. For example, S301 in the method 300 may correspond to S201 in the method 200, i.e., the relevant description in S201 is applicable to S301, which is not elaborated here for simplicity.

However, S308 in the method 300 is different from S208 in the method 200. For example, corresponding to different determination results of the first terminal device in S306, the second terminal device and the third terminal device may execute different steps, which will be described below in conjunction with FIG. 10 to FIG. 13 respectively.

Figure 10:
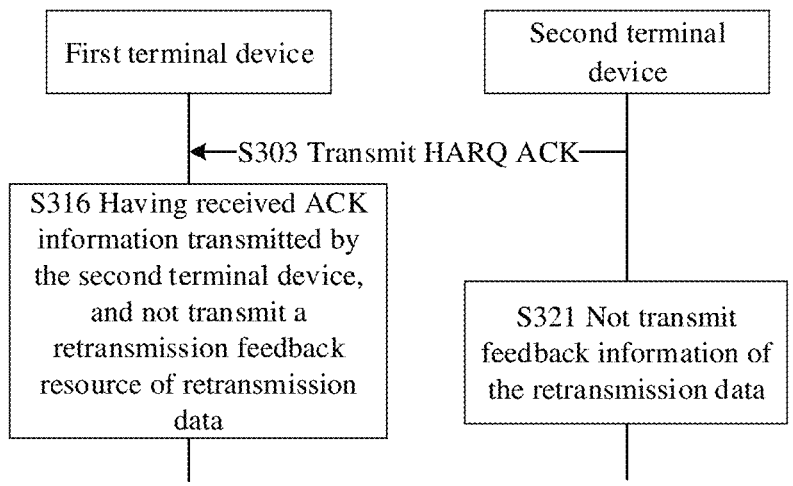
FIG. 10 is a schematic flow chart of still another method for transmitting sidelink data provided by an embodiment of the present disclosure.
Figure 11:
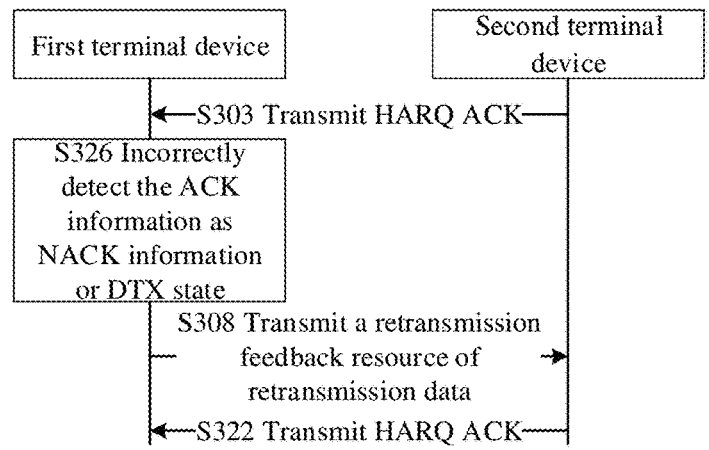
FIG. 11 is a schematic flow chart of still another method for transmitting sidelink data provided by an embodiment of the present disclosure.

First, in conjunction with FIG. 10 and FIG. 11, description is made for the first terminal device and the receiving end second terminal device.

FIG. 10 and FIG. 11 show schematic flow charts of another method 300 for transmitting the sidelink data of embodiments of the present disclosure respectively. Both FIG. 10 and FIG. 11 are continuations of the method 300 in FIG. 9. In other words, FIG. 10 and FIG. 11 are possible implementations of the method 300 in FIG. 9 respectively. The first terminal device in FIG. 10 and FIG. 11 is the first terminal device of the method 300 in FIG. 9; and the second terminal device in FIG. 10 and FIG. 11 is the second terminal device in the method 300 in FIG. 9.

As shown in FIG. 10 and FIG. 11, the method 300 includes: S303, transmitting the HARQ ACK information, i.e., in the case that the second terminal device successfully receives the sidelink data, the second terminal device transmitting the ACK information to the first terminal device. It should be understood that S303 in both FIG. 10 and FIG. 11 corresponds to S303 in FIG. 9, which is not elaborated here for simplicity.

At this time, for S306, the first terminal device receives the feedback information transmitted by the second terminal device. Since the case of incorrect detection by the first terminal device may exist, for step S306, the cases of both FIG. 10 and FIG. 11 may be included. In the first case, as shown in FIG. 10, S306 in the method 300 includes: S316, having received the ACK information transmitted by the second terminal device, and not transmitting the retransmission feedback resource of the retransmission data. In particular, in S302 and S303, the second terminal device successfully receives the sidelink data, and then the ACK information may be fed back to the first terminal device; and correspondingly, the first terminal device may correctly detect the ACK information, and then the first terminal device may no longer transmit the retransmission feedback resource of the retransmission data to the second terminal device. In addition, for the second terminal device, S321 may continue to be executed.

In S321, the feedback information of the retransmission data is not transmitted. Since the first terminal device does not allocate a retransmission feedback resource corresponding to the retransmission data to the second terminal device, the second terminal device does not transmit the feedback information of the retransmission data to the first terminal device. That is, no matter whether the second terminal device successfully receives the retransmission data, the second terminal device abandons transmitting the feedback information of the retransmission data to the first terminal device.

In the second case, as shown in FIG. 11, S306 in the method 300 includes: S326, incorrectly detecting the ACK information as the NACK information or a DTX state. In particular, in S302 and S303, the second terminal device successfully receives the sidelink data, and then the ACK information may be fed back to the first terminal device; and correspondingly, in the S326, the first terminal device may have an incorrect detection, which causes the first terminal device to incorrectly determine that the second terminal device does not successfully receive the sidelink data. For example, the first terminal device may incorrectly determine the ACK information as the NACK information, or the first terminal device may not detect the ACK information and considers that the second terminal device is in the DTX state, and then the first terminal device may determine that the second terminal device does not successfully receive the sidelink data.

When the first terminal device determines that the second terminal device does not successfully receive the sidelink data, the first terminal device may continue to execute S307 and S308.

S307 is S307 shown in FIG. 9, which is not elaborated here.

In S308, the retransmission feedback resource of the retransmission data is transmitted, i.e., the first terminal device transmits the retransmission feedback resource to the second terminal device, where the retransmission feedback resource is used for carrying the feedback information of the retransmission data.

It should be understood that S308 in FIG. 11 may correspond to the part where the first terminal device transmits the retransmission feedback resource to the second terminal device in S208 in the method 200, which is not elaborated here for simplicity.

Correspondingly, since the second terminal device has already successfully received the sidelink data, when the second terminal device also receives the retransmission data of the sidelink data and the retransmission feedback resource of the retransmission data, the second terminal device may transmit the ACK information on the retransmission feedback resource of the retransmission data.

For example, as shown in FIG. 11, in S322, the HARQ ACK is transmitted, i.e., the second terminal device receives the retransmission data of the sidelink data and the retransmission feedback resource. Since the second terminal device has already correctly received the sidelink data, no matter whether the retransmission data is successfully received, in other words, no matter whether the second terminal device determines that the retransmission data is successfully received, the second terminal device transmits the feedback information to the first terminal device on the retransmission feedback resource, and the feedback information is the ACK information.

It should be understood that the step S322 may correspond to S222 in the method 200, i.e., the related description of S222 is applicable to the S322, which is not elaborated here for simplicity.

The first terminal device and the receiving end third terminal device will be described below in conjunction with FIG. 12 and FIG. 13.

Figure 12:
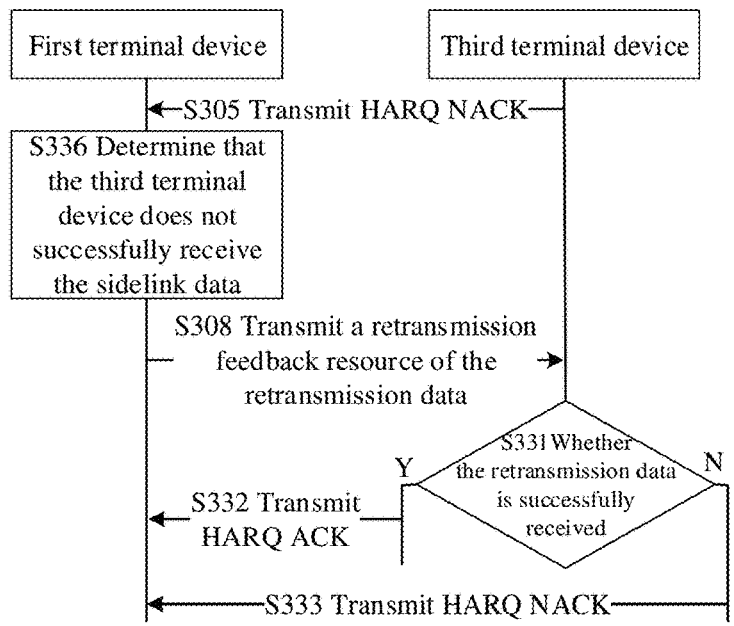
FIG. 12 is a schematic flow chart of still another method for transmitting sidelink data provided by an embodiment of the present disclosure.
Figure 13:
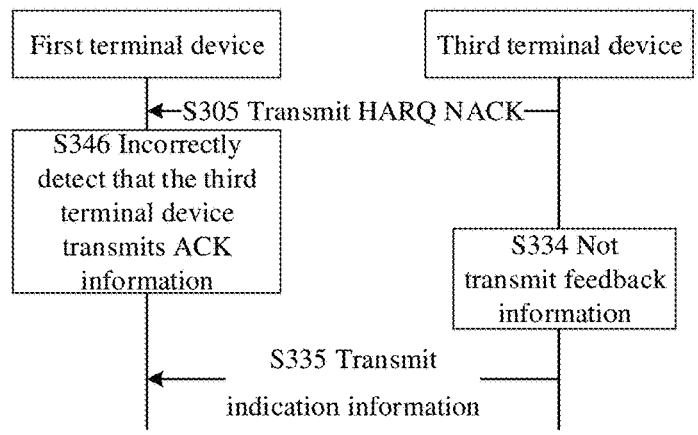
FIG. 13 is a schematic flow chart of still another method for transmitting sidelink data provided by an embodiment of the present disclosure.

FIG. 12 and FIG. 13 show schematic flow charts of another method 300 for transmitting the sidelink data of embodiments of the present disclosure respectively. FIG. 12 and FIG. 13 are both continuations of the method 300 in FIG. 9. In other words, FIG. 12 and FIG. 13 are possible implementations of the method 300 in FIG. 9 respectively. The first terminal device in FIG. 12 and FIG. 13 is the first terminal device of the method 300 in FIG. 9; and the third terminal device in FIG. 12 and FIG. 13 is the third terminal device in the method 300 in FIG. 9.

As shown in FIG. 12 and FIG. 13, the method 300 includes: S305, transmitting the HARQ NACK information, i.e., in the case that the sidelink data is not successfully received, the third terminal device transmitting the NACK information to the first terminal device. It should be understood that S303 in both FIG. 12 and FIG. 13 corresponds to S305 in FIG. 9, which is not elaborated here for simplicity.

At this time, for S306, the first terminal device receives the feedback information transmitted by the third terminal device. Since the case of incorrect detection by the first terminal device may exist, for step S306, the cases of both FIG. 12 and FIG. 13 may be included.

In the first case, as shown in FIG. 12, S306 in the method 300 includes: S336, determining that the third terminal device does not successfully receive the sidelink data. In particular, in S304 and S305, the third terminal device does not successfully receive the sidelink data, and then the third terminal device may feed the NACK information back to the first terminal device or may not transmit the feedback information; and correspondingly, in S336, the determining by first terminal device that the third terminal device does not successfully receive the sidelink data, may include: the third terminal device correctly receiving the NACK information; or the third terminal device correctly detecting and determining that the feedback information is not received; or the third terminal device incorrectly detecting, but determining that the third terminal device does not successfully receive the sidelink data.

In other words, in the case that the third terminal device does not successfully receive the sidelink data, no matter whether the first terminal device correctly performs detection, the first terminal device determines that the third terminal device does not successfully receive the sidelink data, then the first terminal device may continue to execute S307 and S308.

S307 is S307 shown in FIG. 9, which is not elaborated here.

In S308, the retransmission feedback resource of the retransmission data is transmitted, i.e., the first terminal device transmits the retransmission feedback resource to the third terminal device, where the retransmission feedback resource is used for carrying the feedback information of the retransmission data.

It should be understood that S308 in FIG. 12 may correspond to the part where the first terminal device transmits the retransmission feedback resource to the third terminal device in S208 in the method 200, which is not elaborated here for simplicity.

Correspondingly, since the third terminal device does not successfully receive the sidelink data, when the third terminal device receives the retransmission data of the sidelink data and the retransmission feedback resource of the retransmission data, the third terminal device may execute the following steps S331 to S333.

In S331, it is determined whether the retransmission data is successfully received, i.e., the third terminal device determines whether the retransmission data is successfully received, and if the third terminal device successfully receives the retransmission data, S332 is executed; and if the third terminal device does not successfully receive the retransmission data, then S333 is executed.

In S332, the HARQ ACK is transmitted, i.e., in the case that the third terminal device successfully receives the retransmission data, the third terminal device transmits the ACK information to the first terminal device on the retransmission feedback resource.

In S333, the HARQ NACK is transmitted, i.e., in the case that the third terminal device does not successfully receive the retransmission data, the third terminal device transmits the NACK information to the first terminal device on the retransmission feedback resource. Alternatively, the third terminal device does not detect the control information of the retransmission data, and then the third terminal device may not receive the retransmission data, and then does not transmit the feedback information of the retransmission data.

It should be understood that S331 to S333 in the method 300 correspond to S231 to S233 in the method 200, which is not elaborated here for simplicity.

In the second case, as shown in FIG. 13, S306 in the method 300 includes: S346, incorrectly detecting that the third terminal device transmits the ACK information. In particular, in S304 and S305, the third terminal device does not successfully receive the sidelink data, and then the third terminal device may feed the NACK information back to the first terminal device or not transmit the feedback information; and correspondingly, in the S346, the first terminal device may incorrectly detect the feedback information of the third terminal device as the ACK information.

Then, according to S308 shown in FIG. 9, the first terminal device considers that the third terminal device successfully receives the sidelink data, and therefore may not transmit the retransmission feedback resource of the retransmission data of the sidelink data to the third terminal device.

Therefore, as shown in FIG. 12, in S334, the feedback information is not transmitted, i.e., although the third terminal device may have received the retransmission data of the sidelink data transmitted by the first terminal device, the third terminal device does not receive the retransmission feedback resource corresponding to the feedback information of the retransmission data. Therefore, the third terminal device does not transmit the feedback information of the retransmission data to the first terminal device, i.e., the third terminal device abandons transmitting the feedback information to the first terminal device.

It should be understood that since the third terminal device does not successfully receive the sidelink data, then there may be the possibility that the retransmission data of the sidelink data is not successfully received. However, the third terminal device does not receive the retransmission feedback resource of the feedback information of the retransmission data, and then the third terminal device cannot transmit the feedback information of the retransmission data to the first terminal device.

Therefore, the method 300 may also include: S335, transmitting indication information, i.e., when the third terminal device does not successfully receive the sidelink data and does not successfully obtain the retransmission feedback resource of the retransmission data, the third terminal device may transmit the indication information to the first terminal device. The indication information is used for indicating that the third terminal device does not correctly receive the sidelink data, or is used for indicating that the first terminal device allocates a transmission resource for transmitting the feedback information to the third terminal device; or is used for indicating to the first terminal device to transmit the retransmission data. In this way, in the case that the third terminal device does not successfully receive the sidelink data, or even the retransmission data of the sidelink data is not successfully received, the feedback resource of the feedback information transmitted by the first terminal device may be used for transmitting the feedback information to the first terminal device. Optionally, the indication information may be carried through a PSCCH or a PSSCH.

Therefore, in the method for transmitting sidelink data of the embodiments of the present disclosure, in the case that the transmitting end terminal receives the ACK transmitted by the receiving end terminal, when the transmitting end performs retransmission, the transmission resource for transmitting the feedback information is not allocated to the receiving end terminal; but the transmitting end terminal has received the NACK or the DTX transmitted by the receiving end terminal, and when the transmitting end terminal performs retransmission, the transmission resource for transmitting the feedback information may be allocated to the receiving end terminal. That is, the transmitting end terminal only allocates the transmission resource for the feedback information of the retransmission data to a terminal that has not received the sidelink data, which may reduce the overhead of the feedback resource, reduce the conflict between feedback channels, and improve the detection success rate of the feedback information.

It should be understood that in various embodiments of the present disclosure, sizes of the sequence numbers of the foregoing processes do not indicate execution sequences. The execution sequence of each process should be determined according to a function and inherent logic thereof, and should not constitute any limit on the implementation process of the embodiments of the present disclosure.

The method for transmitting the sidelink data according to the embodiments of the present disclosure is described in detail in conjunction with FIG. 1 to FIG. 13 hereinabove, and a terminal device according to an embodiment of the present disclosure will be described below in conjunction with FIG. 14 to FIG. 17.

Figure 14:
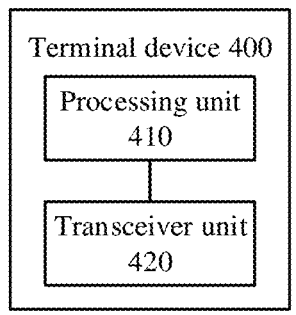
FIG. 14 is a schematic block diagram of a terminal device provided by an embodiment of the present disclosure.

As shown in FIG. 14, a terminal device 400 according to an embodiment of the present disclosure includes: a processing unit 410 and a transceiver unit 420. Optionally, the terminal device 400 may be the first terminal device in the aforementioned method 200. In particular, the transceiver unit 420 is configured to: transmit sidelink data to a plurality of terminal devices; and the transceiver unit 420 is further configured to: if the processing unit 410 determines that a terminal device that does not successfully receive the sidelink data exists in the plurality of terminal devices, transmit retransmission data of the sidelink data and a retransmission feedback resource to each terminal device of the plurality of terminal devices, where the retransmission feedback resource is used for transmitting by the plurality of terminal devices feedback information of the retransmission data.

Optionally, as an embodiment, the transceiver unit 420 is further configured to: transmit a data feedback resource to the plurality of terminal devices, where the data feedback resource is used for transmitting by the plurality of terminal devices the feedback information of the sidelink data; and the processing unit 410 is further configured to: detect the feedback information of the sidelink data transmitted by the plurality of terminal devices on the data feedback resource; and determine whether a terminal device that does not successfully receive the sidelink data exists in the plurality of terminal devices according to the detection result.

Optionally, as an embodiment, the processing unit 410 is further configured to: if feedback information of the sidelink data of the second terminal device in the plurality of terminal devices is not detected (found) on the data feedback resource, determine that the second terminal device does not successfully receive the sidelink data; or if the feedback information of the sidelink data transmitted by the second terminal device is detected on the data feedback resource, determine whether the second terminal device successfully receives the sidelink data according to the feedback information of the sidelink data.

Optionally, as an embodiment, the processing unit 410 is further configured to: if the feedback information of the sidelink data is acknowledgement (ACK) information, determine that the second terminal device successfully receives the sidelink data; and if the feedback information of the sidelink data is negative acknowledgement (NACK) information, determine that the second terminal device does not successfully receive the sidelink data.

It should be understood that the aforementioned and other operation and/or function of each unit in the terminal device 400 are used to implement the corresponding process of the first terminal device in the method 200 in FIG. 6 to FIG. 8, which is not elaborated here for simplicity.

Optionally, the terminal device may also be the second terminal device or the third terminal device in the aforementioned method 200. In particular, the transceiver unit 420 is configured to: receive the sidelink data, where the sidelink data is transmitted by the first terminal device to a plurality of terminal device, and the plurality of terminal device includes the terminal device; the transceiver unit 420 is further configured to: receive the retransmission data of the sidelink data transmitted by the first terminal device; the processing unit 410 is configured to: obtain a retransmission feedback resource, where the retransmission feedback resource is used for carrying the feedback information of the retransmission data; and the processing unit 410 is further configured to: determine whether to transmit the feedback information of the retransmission data to the first terminal device according to whether the sidelink data is successfully received.

Optionally, as an embodiment, the processing unit 410 is further configured to: if the transceiver unit 420 successfully receives the sidelink data, transmit the acknowledgement (ACK) information to the first terminal device through the transceiver unit 420 or abandon transmitting the feedback information of the retransmission data to the first terminal device, on the retransmission feedback resource.

Optionally, as an embodiment, the processing unit 410 is further configured to: if the transceiver unit 420 successfully receives the sidelink data and the retransmission data, transmit the ACK information to the first terminal device through the transceiver unit 420 on the retransmission feedback resource; or if the transceiver unit 420 successfully receives the sidelink data and does not successfully receive the retransmission data, abandon transmitting the feedback information of the retransmission data to the first terminal device.

Optionally, as an embodiment, the processing unit 410 is further configured to: if the transceiver unit 420 does not successfully receive the sidelink data, transmit the feedback information of the retransmission data to the first terminal device through the transceiver unit 420 on the retransmission feedback resource according to whether the retransmission data is successfully received.

Optionally, as an embodiment, the transceiver unit 420 is further configured to: if the transceiver unit 420 successfully receives the retransmission data, transmit the ACK information to the first terminal device through the transceiver unit 420 on the retransmission feedback resource; or if the transceiver unit 420 does not successfully receive the retransmission data, transmit the negative-acknowledgement (NACK) information to the first terminal device through the transceiver unit 420 or abandon transmitting the feedback information of the retransmission data to the first terminal device, on the retransmission feedback resource.

Optionally, as an embodiment, the processing unit 410 is further configured to: receive through the transceiver unit 420 the retransmission feedback resource transmitted by the first terminal device; or determine the retransmission feedback resource from a feedback resource set.

Optionally, as an embodiment, the processing unit 410 is further configured to: obtain a data feedback resource of the sidelink data; if the transceiver unit 420 successfully receives the sidelink data, transmit the ACK information to the first terminal device through the transceiver unit 420 on the data feedback resource; or if the transceiver unit 420 does not successfully receive the sidelink data, transmit the NACK information to the first terminal device through the transceiver unit 420 or abandon transmitting the feedback information of the sidelink data to the first terminal device, on the data feedback resource.

Optionally, as an embodiment, the processing unit 410 is further configured to: receive through the transceiver unit 420 the data feedback resource transmitted by the first terminal device; or determine the data feedback resource from the feedback resource set.

It should be understood that the aforementioned and other operation and/or function of each unit in the terminal device 400 are used to implement the corresponding process of the second terminal device and the third terminal device in the method in FIG. 6 to FIG. 8, which is not elaborated here for simplicity.

Therefore, the terminal device in the embodiments of the present disclosure, serving as the transmitting end, transmits the sidelink data to the receiving end. If the transmitting end terminal determines that a terminal device that does not successfully receive the sidelink data exists, when the transmitting end terminal performs retransmission, no matter the receiving end terminal feeds the ACK or the NACK back, the transmitting end terminal may allocate the transmission resource for transmitting the feedback information to each receiving end terminal. In other words, when transmitting the sidelink data and its retransmission data, the transmitting end terminal allocates the feedback transmission resource for all of the receiving end terminals, and the numbers of transmission resources allocated by the transmitting end terminal are consistent. However, a terminal that correctly received the sidelink data before may not transmit the feedback information, which may reduce the overhead of feedback signaling; or a terminal correctly received the sidelink data before, and then correctly receives the retransmission, this terminal feeds the ACK back for both the above conditions, which may improve the success rate of feedback channel reception.

Optionally, the terminal device may also be the first terminal device in the foregoing method 300. In particular, the transceiver unit 420 is configured to: transmit sidelink data to a plurality of terminal devices; and the processing unit 410 is configured to: determine that a third terminal device that does not successfully receive the sidelink data and a second terminal device that successfully receives the sidelink data exist in the plurality of terminal devices. The transceiver unit 420 is further configured to: only transmit retransmission data of the sidelink data and a retransmission feedback resource to the third terminal device, and the retransmission feedback resource is used for carrying feedback information of the retransmission data.

Optionally, as an embodiment, the processing unit 410 is further configured to: abandon transmitting the retransmission feedback resource to the second terminal device.

Optionally, as an embodiment, the transceiver unit 420 is further configured to: in the case that the processing unit 410 abandons transmitting the retransmission feedback resource to the second terminal device, if the transceiver unit 420 has received indication information transmitted by the second terminal device, and the indication information is used for indicating that the second terminal device does not successfully receive the sidelink data, transmit the retransmission data of the sidelink data and the retransmission feedback resource to the second terminal device according to the indication information.

Optionally, as an embodiment, the processing unit 410 is further configured to: detect the feedback information of the retransmission data transmitted by the third terminal device on the retransmission feedback resource; and determine whether the third terminal device successfully receives the retransmission data according to the detection result.

Optionally, as an embodiment, the transceiver unit 420 is further configured to: transmit the data feedback resource to the plurality of terminal devices, where the data feedback resource is used for transmitting by the plurality of terminal devices the feedback information of the sidelink data; and the processing unit 410 is further configured to: detect the feedback information of the sidelink data transmitted by the plurality of terminal devices on the data feedback resource; and determine whether the second terminal device and/or the third terminal device exists in the plurality of terminal devices according to the result of the detection.

Optionally, as an embodiment, the processing unit 410 is further configured to: if the feedback information of the sidelink data of the third terminal device is not detected on the data feedback resource, determine that the third terminal device does not successfully receive the sidelink data; or if the feedback information of the sidelink data transmitted by the third terminal device is detected on the data feedback resource, determine whether the third terminal device successfully receives the sidelink data according to the feedback information of the sidelink data.

Optionally, as an embodiment, the processing unit 410 is further configured to: if the feedback information of the sidelink data is the acknowledgement (ACK) information, determine that the third terminal device successfully receives the sidelink data; and if the feedback information of the sidelink data is the negative acknowledgement (NACK) information, determine that the third terminal device does not successfully receive the sidelink data.

Optionally, as an embodiment, the transceiver unit 420 is further configured to: if the processing unit 410 determines that a terminal device that does not successfully receive the sidelink data exists in the plurality of terminal devices, transmit the retransmission data to the plurality of terminal devices.

It should be understood that the aforementioned and other operation and/or function of each unit in the terminal device 400 are used to implement the corresponding process of the first terminal device in the method 300 in FIG. 9 to FIG. 13, which is not elaborated here for simplicity.

Optionally, the terminal device may also be the second terminal device or the third terminal device in the aforementioned method 300. In particular, the transceiver unit 420 is configured to: receive sidelink data, where the sidelink data is transmitted by the first terminal device to a plurality of terminal devices, and the plurality of terminal devices include the terminal device; the transceiver unit 420 is further configured to: receive retransmission data of the sidelink data transmitted by the first terminal device; and the processing unit 410 is configured to: in the case that the transceiver unit 420 successfully receives the sidelink data and has not received a retransmission feedback resource transmitted by the first terminal device, abandon transmitting feedback information of the retransmission data to the first terminal device, where the retransmission feedback resource is used for carrying feedback information of the retransmission data.

Optionally, as an embodiment, the processing unit 410 is further configured to: in the case that the sidelink data is not successfully received and the retransmission feedback resource transmitted by the first terminal device is not received, abandon transmitting the feedback information of the retransmission data to the first terminal device.

Optionally, as an embodiment, the processing unit 410 is further configured to: in the case that the transceiver unit 420 does not successfully receive the sidelink data and has not received the retransmission feedback resource transmitted by the first terminal device, transmit indication information to the first terminal device through the transceiver unit 420, where the indication information is used for determining by the first terminal device that the terminal device does not successfully receive the sidelink data.

It should be understood that the aforementioned and other operation and/or function of each unit in the terminal device 400 are used to implement the corresponding process of the second terminal device and the third terminal device in the method 300 in FIG. 9 to FIG. 13, which is not elaborated here for simplicity.

Therefore, for a terminal device in the embodiments of the present disclosure, in the case that the terminal serving as the transmitting end receives the ACK transmitted by the receiving end terminal, when the transmitting end performs retransmission, the transmission resource for transmitting the feedback information is not allocated to the receiving end terminal; but if the transmitting end terminal has received the NACK or the DTX transmitted by the receiving end terminal, when the transmitting end terminal performs retransmission, the transmission resource for transmitting the feedback information may be allocated to the receiving end terminal. That is, the transmitting end terminal only allocates the transmission resource for the feedback information of the retransmission data to a terminal that has not received the sidelink data, which may reduce the overhead of the feedback resource, reduce the conflict between feedback channels, and improve the detection success rate of feedback information.

Figure 15:
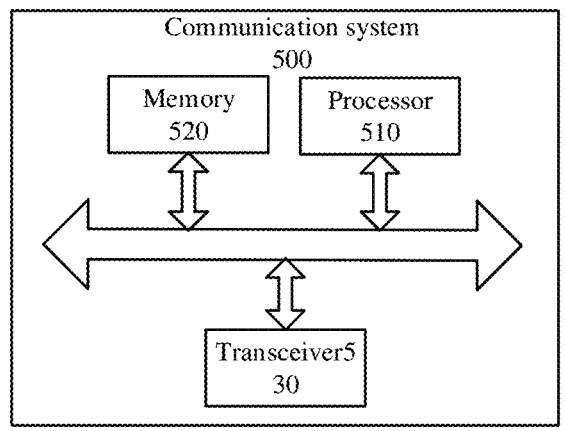
FIG. 15 is a schematic block diagram of a communication device provided by an embodiment of the present disclosure.

FIG. 15 is a schematic structural diagram of a communication device 500 provided by an embodiment of the present disclosure. The communication device 500 shown in FIG. 15 includes a processor 510, and the processor 510 may call and run a computer program from the memory to implement the method in the embodiments of the present disclosure.

Optionally, as shown in FIG. 15, the communication device 500 may also include a memory 520. The processor 510 may call and run a computer program from the memory 520 to implement the method in the embodiments of the present disclosure.

The memory 520 may be one separate device independent of the processor 510, or may be integrated into the processor 510.

Optionally, as shown in FIG. 15, the communication device 500 may also include a transceiver 530, and the processor 510 may control the transceiver 530 to communicate with other device. In particular, information or data may be transmitted to other device, or information or data transmitted by other device may be received.

The transceiver 530 may include a transmitter and a receiver. The transceiver 530 may also include an antenna, and the number of antenna may be one or more.

Optionally, the communication device 500 may specifically be the network device of the embodiments of the present disclosure, and the communication device 500 may realize the corresponding process realized by the network device in each method of the embodiments of the present disclosure, which is not elaborated here for simplicity.

Optionally, the communication device 500 may specifically be any mobile terminal/terminal device of the embodiments of the present disclosure, for example, may be the first terminal device, the second terminal device, or the third terminal device in the embodiments of the present disclosure; and the communication device 500 may realize the corresponding process realized by the mobile terminal/terminal device in each method of the embodiments of the present disclosure, which is not elaborated here for simplicity.

Figure 16:
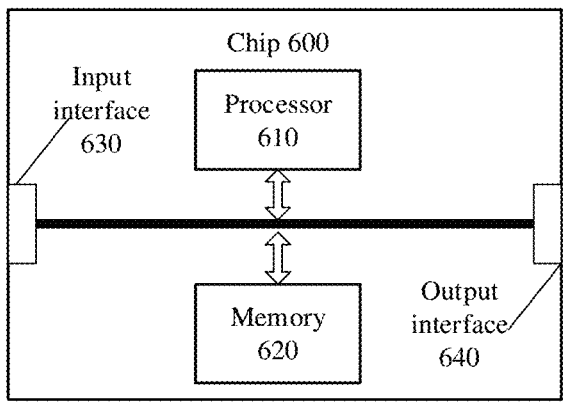
FIG. 16 is a schematic block diagram of a chip provided by an embodiment of the present disclosure.

FIG. 16 is a schematic structural diagram of a chip of an embodiment of the present disclosure. The chip 600 shown in FIG. 16 includes a processor 610, and the processor 610 may call and run a computer program from a memory to implement the method in the embodiments of the present disclosure.

Optionally, as shown in FIG. 16, the chip 600 may also include a memory 620. The processor 610 may call and run a computer program from the memory 620 to implement the method in the embodiments of the present disclosure.

The memory 620 may be one separate device independent of the processor 610, or may be integrated into the processor 610.

Optionally, the chip 600 may also include an input interface 630. The processor 610 may control the input interface 630 to communicate with other device or chip. In particular, information or data transmitted by other device or chip may be obtained.

Optionally, the chip 600 may also include an output interface 640. The processor 610 may control the output interface 640 to communicate with other device or chip. In particular, information or data may be output to other device or chip.

Optionally, the chip is applicable to the network device in the embodiments of the present disclosure, and the chip may realize the corresponding process realized by the network device in each method of the embodiments of the present disclosure, which is not elaborated here for simplicity.

Optionally, the chip is applicable to any mobile terminal/terminal device in the embodiments of the present disclosure, and the chip may realize the corresponding process realized by the mobile terminal/terminal device in each method of the embodiments of the present disclosure, such as the first terminal device, the second terminal device and the third terminal device, which is not elaborated here for simplicity.

It should be understood that the chip mentioned in embodiments of the present disclosure may also be referred to as a system-level-chip, a system chip, a chip system or a system-on-chip, etc.

Figure 17:
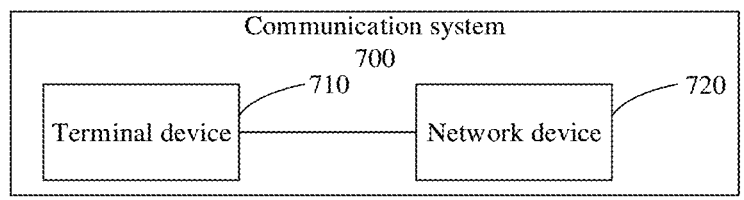
FIG. 17 is a schematic diagram of a communication system provided by an embodiment of the present disclosure.

FIG. 17 is a schematic block diagram of a communication system 700 provided by an embodiment of the present disclosure. As shown in FIG. 17, the communication system 700 includes a terminal device 710 and a network device 720.

The terminal device 710 may be configured to realize the corresponding functions realized by any of the terminal device in the foregoing methods, and the network device 720 may be configured to realize the corresponding functions realized by the network device in the foregoing methods, which is not elaborated here for simplicity.

It should be understood that the processor of the embodiments of the present disclosure may be a type of integrated circuit chip, with a signal processing capability. In the realization process, each step of the foregoing method embodiments may be completed through integrated logic circuits of hardware or instructions in the form of software in the processor. The foregoing processor may be a general-purpose processor, a Digital Signal Processor (DSP), an Application Specific Integrated Circuit (ASIC), a Field Programmable Gate Array (FPGA) or other programmable logic devices, discrete gates or transistor logic devices, discrete hardware components. Each method, step and logic block diagram disclosed in the embodiments of the present disclosure may be realized or performed. The general-purpose processor may be a microprocessor, or the processor may also be any conventional processor, etc. The steps of the methods disclosed in combination with the embodiments of the present disclosure may be directly completed by a hardware decoding processor, or completed by a combination of hardware and a software module in the decoding processor. The software module may be located in other mature storage medium in the field such as a random access memory, a flash memory, a read-only memory, a programmable ROM or an electrically EPROM, a register or the like. The storage medium is located in the memory, and the processor reads information in a memory so as to complete the steps of the aforementioned methods in conjunction with its hardware.

It may be understood that the memory in the embodiments of the present disclosure may be a volatile memory or a non-volatile memory, or may include both a volatile memory and a non-volatile memory. The nonvolatile memory may be a Read-Only Memory (ROM), a Programmable ROM (PROM), an Erasable PROM (EPROM), an Electrically EPROM (EEPROM) or a flash memory. The volatile memory may be a Random Access Memory (RAM), and it is used as an external cache. Through exemplary but not limitative illustration, many forms of RAM are available, for example, a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It should be noted that the memory of the systems and methods described herein is intended to include, but not limited to, these and any other suitable types of memories.

It should be understood that the foregoing memories are exemplary but not limitative illustration. For example, the memory in the embodiments of the present disclosure may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM) and a Direct Rambus RAM (DR RAM), etc. That is, the memory in the embodiments of the present disclosure is intended to include, but not limited to, these and any other suitable types of memories.

The embodiments of the present disclosure also provide a computer-readable storage medium for storing a computer program.

Optionally, the computer-readable storage medium is applicable to the network device in the embodiments of the present disclosure, and the computer program causes a computer to perform the corresponding processes implemented by the network device in each method of the embodiments of the present disclosure, which is not elaborated here for simplicity.

Optionally, the computer-readable storage medium is applicable to the mobile terminal/communication device in the embodiments of the present disclosure, and the computer program causes a computer to perform the corresponding processes implemented by the mobile terminal/communication device in each method of the embodiments of the present disclosure, which is not elaborated here for simplicity.

The embodiments of the present disclosure also provide a computer program product, including a computer program instruction.

Optionally, the computer program product is applicable to the network device in the embodiments of the present disclosure, and the computer program instruction causes a computer to perform the corresponding processes implemented by the network device in each method of the embodiments of the present disclosure, which is not elaborated here for simplicity.

Optionally, the computer program product is applicable to the mobile terminal/terminal device in the embodiments of the present disclosure, and the computer program instruction causes a computer to perform the corresponding processes implemented by the mobile terminal/communication device in each method of the embodiments of the present disclosure, which is not elaborated here for simplicity.

The embodiments of the present disclosure also provide a computer program.

Optionally, the computer program is applicable to the network device in the embodiments of the present disclosure. When the computer program is run on a computer, the computer is caused to perform the corresponding processes implemented by the network device in each method of the embodiments of the present disclosure, which is not elaborated here for simplicity.

Optionally, the computer program is applicable to the mobile terminal/terminal device in the embodiments of the present disclosure. When the computer program is run on a computer, the computer is caused to perform the corresponding processes implemented by the mobile terminal/terminal device in each method of the embodiments of the present disclosure, which is not elaborated here for simplicity.

Those of ordinary skilled in the art may realize that the unit and algorithm step of each example described in conjunction with the embodiments disclosed herein can be implemented with electronic hardware, or a combination of computer software and electronic hardware. Whether these functions are performed by hardware or software depends on the specific application and design constraint of the technical solution. Professionals may use a different method to realize the described function for each specific application, but such realization should not be considered beyond the scope of the present disclosure.

Those of skilled in the art may clearly understand that for the convenience and simplicity of the description, for the specific working process of the systems, apparatuses and units described above, the corresponding process in the foregoing method embodiments may be referred to, which is not be elaborated here.

In several embodiments provided by the present disclosure, it should be understood that the system, apparatus and method disclosed may be implemented in other manner. For example, the apparatus embodiments described above are merely schematic. For example, said division of the units is only a type of logical function division, and there may be other division manner in actual implementation, for example, a plurality of units or components may be combined or integrated into another system, or some features may be ignored or not performed. On the other hand, a mutual coupling, a direct coupling or a communication connection displayed or discussed may be an indirect coupling or a communication connection through some interfaces, apparatuses or units, and may be electrical, mechanical or in other form.

The unit illustrated as a separate component may or may not be physically separate, and a component displayed as a unit may or may not be a physical unit, i.e. it may be located in one place or may also be distributed onto a plurality of network units. Some or all of the units may be selected according to the actual need to achieve the objective of the solution of the present embodiments.

In addition, each functional unit in each embodiment of the present disclosure may be integrated into one processing unit, or it may be that each unit exists alone physically, or it may be that two or more units are integrated into one unit.

The function may also be stored in a computer-readable storage medium if being realized in the form of a software functional unit and sold or used as an independent product. Based on such understanding, the essence of the technical solution of the present disclosure or the part contributing to the related art or part of the technical solution may be embodied in the form of a software product, and the computer software product is stored in a storage medium including several instructions such that a computer device (which may be a personal computer, a server, or a network device, etc.) executes all or part of the steps of the method described in each embodiment of the present disclosure. The aforementioned storage medium includes a U disk, a mobile hard disk, a Read-Only Memory (ROM), a Random Access Memory (RAM), a magnetic disk or an optical disk and other mediums that can store program codes.

The foregoing descriptions are merely specific implementation manners of the embodiments of the present disclosure, and the protection scope of the embodiments of the present disclosure is not limited thereto. Any person skilled in the art can easily think of changes or substitutions within the technical scope disclosed in the present disclosure, and all the changes or substitutions should be covered in the protection scope of the present disclosure. Therefore, the protection scope of the present disclosure should be subject to the protection scope of the claims.

What is claimed is:

1. A method for transmitting sidelink data, comprising:
receiving, by a second terminal device in a plurality of terminal devices, sidelink data, wherein the sidelink data is transmitted to the plurality of terminal devices by a first terminal device;
receiving, by the second terminal device, retransmission of the sidelink data transmitted by the first terminal device;
obtaining, by the second terminal device, a retransmission feedback resource, wherein the retransmission feedback resource is used for carrying feedback information of the retransmission; and
determining, by the second terminal device, whether to transmit the feedback information of the retransmission to the first terminal device according to whether the sidelink data is successfully decoded,
wherein the determining, by the second terminal device, whether to transmit the feedback information of the retransmission to the first terminal device according to whether the sidelink data is successfully decoded, comprises:
responsive to determining that the second terminal device successfully decodes the sidelink data, transmitting, by the second terminal device, acknowledgement (ACK) information to the first terminal device or abandoning, by the second terminal device, transmitting the feedback information of the retransmission to the first terminal device, on the retransmission feedback resource.

2. The method according to claim 1, wherein the determining, by the second terminal device, whether to transmit the feedback information of the retransmission to the first terminal device according to whether the sidelink data is successfully decoded, comprises:
responsive to determining that the second terminal device successfully decodes the sidelink data and does not successfully decode the retransmission, abandoning, by the second terminal device, transmitting the feedback information of the retransmission to the first terminal device.

3. The method according to claim 1, wherein the determining, by the second terminal device, whether to transmit the feedback information of the retransmission to the first terminal device according to whether the sidelink data is successfully decoded, comprises:
responsive to determining that the second terminal device does not successfully decode the sidelink data, transmitting, by the second terminal device, the feedback information of the retransmission to the first terminal device on the retransmission feedback resource according to whether the retransmission is successfully decoded.

4. The method according to claim 3, wherein the transmitting, by the second terminal device, the feedback information of the retransmission to the first terminal device on the retransmission feedback resource according to whether the retransmission is successfully decoded, comprises:
responsive to determining that the second terminal device does not successfully decode the retransmission, transmitting, by the second terminal device, negative acknowledgement (NACK) information to the first terminal device on the retransmission feedback resource.

5. The method according to claim 1, wherein the obtaining, by the second terminal device, the retransmission feedback resource, comprises:
receiving, by the second terminal device, the retransmission feedback resource transmitted by the first terminal device; or
determining, by the second terminal device, the retransmission feedback resource from a feedback resource set.

6. The method according to claim 5, wherein the second terminal device selects a resource from a feedback resource set according to identification information of the second terminal device.

7. The method according to claim 6, wherein the identification information is identification information of the second terminal device in a group.

8. The method according to claim 1, further comprising:
obtaining, by the second terminal device, a data feedback resource of the sidelink data; and
responsive to determining that the second terminal device successfully decodes the sidelink data, transmitting, by the second terminal device, ACK information to the first terminal device on the data feedback resource; or
responsive to determining that the second terminal device does not successfully decode the sidelink data, transmitting, by the second terminal device, NACK information to the first terminal device or abandoning, by the second terminal device, transmitting feedback information of the sidelink data to the first terminal device, on the data feedback resource.

9. The method according to claim 8, wherein the obtaining, by the second terminal device, the data feedback resource of the sidelink data, comprises:
receiving, by the second terminal device, the data feedback resource transmitted by the first terminal device; or
determining, by the second terminal device, the data feedback resource from a feedback resource set.

10. A terminal device, comprising:
a processor; and
a memory,
wherein the memory is configured to store a computer program, and the processor is configured to call and run the computer program stored in the memory so as to:
receive sidelink data, wherein the sidelink data is transmitted to a plurality of terminal devices by a first terminal device, and the plurality of terminal devices comprises the terminal device;
receive retransmission of the sidelink data transmitted by the first terminal device;
obtain a retransmission feedback resource, wherein the retransmission feedback resource is used for carrying feedback information of the retransmission; and
determine whether to transmit the feedback information of the retransmission to the first terminal device according to whether the sidelink data is successfully decoded,
wherein the processor is further configured to:
transmit acknowledgement (ACK) information to the first terminal device or abandon transmitting the feedback information of the retransmission to the first terminal device, on the retransmission feedback resource, responsive to determining that the sidelink data is successfully decoded.

11. The terminal device according to claim 10, wherein the processor is further configured to:
abandon transmitting the feedback information of the retransmission to the first terminal device, responsive to determining that the sidelink data is successfully decoded and the retransmission is not successfully decoded.

12. The terminal device according to claim 10, wherein the processor is further configured to:
transmit the feedback information of the retransmission to the first terminal device on the retransmission feedback resource according to whether the retransmission is successfully decoded, responsive to determining that the sidelink data is not successfully decoded.

13. The terminal device according to claim 12, wherein the processor is further configured to:
transmit negative acknowledgement (NACK) information to the first terminal device, on the retransmission feedback resource, responsive to determining that the retransmission is not successfully decoded.

14. The terminal device according to claim 10, wherein the processor is further configured to:
receive the retransmission feedback resource transmitted by the first terminal device; or determine the retransmission feedback resource from a feedback resource set.

15. The terminal device according to claim 14, wherein the processor is further configured to select a resource from a feedback resource set according to identification information of the second terminal device.

16. The terminal device according to claim 15, wherein the identification information is identification information of the second terminal device in a group.

17. The terminal device according to claim 10, wherein the processor t is further configured to:
   obtain a data feedback resource of the sidelink data; and
   transmit ACK information to the first terminal device on the data feedback resource, responsive to determining that the sidelink data is successfully decoded; or
   transmit NACK information to the first terminal device or abandon transmitting the feedback information of the sidelink data to the first terminal device, on the data feedback resource, responsive to determining that the sidelink data is not successfully decoded.

18. The terminal device according to claim 17, wherein the processor is further configured to:
   receive the data feedback resource transmitted by the first terminal device; or
   determine the data feedback resource from a feedback resource set.

\* \* \* \* \*